United States Patent
Feaster et al.

(10) Patent No.: US 12,146,234 B2
(45) Date of Patent: Nov. 19, 2024

(54) ADVANCED MANUFACTURED VAPOR-FED ELECTROCHEMICAL REACTOR (AM-VFR) FOR IMPROVED PERFORMANCE FOR ELECTROCHEMICAL CONVERSION

(71) Applicant: LAWRENCE LIVERMORE NATIONAL SECURITY, LLC, Livermore, CA (US)

(72) Inventors: Jeremy Taylor Feaster, Fremont, CA (US); Sarah Baker, Dublin, CA (US); Daniel Corral, Fremont, CA (US); Eric Duoss, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 716 days.

(21) Appl. No.: 17/010,680

(22) Filed: Sep. 2, 2020

(65) Prior Publication Data
US 2022/0064806 A1    Mar. 3, 2022

(51) Int. Cl.
*C25B 9/63* (2021.01)
*B29C 64/124* (2017.01)
(Continued)

(52) U.S. Cl.
CPC ............. *C25B 9/63* (2021.01); *B33Y 80/00* (2014.12); *C25B 1/00* (2013.01); *C25B 1/01* (2021.01);
(Continued)

(58) Field of Classification Search
CPC .............. C25B 1/23; C25B 3/26; C25B 9/19
See application file for complete search history.

(56) References Cited

U.S. PATENT DOCUMENTS

| | | | |
|---|---|---|---|
| 2016/0017503 A1* | 1/2016 | Kaczur | C25B 3/25 205/346 |
| 2018/0023201 A1 | 1/2018 | Dominguez Benetton et al. | |
| 2021/0062349 A1* | 3/2021 | Agapie | C25B 3/25 |

FOREIGN PATENT DOCUMENTS

| | | | |
|---|---|---|---|
| JP | 2015-054994 A | 3/2015 | |
| WO | WO-2018/195045 A1 | 10/2018 | |
| WO | WO-2020146754 A1 * | 7/2020 | B33Y 70/00 |

OTHER PUBLICATIONS

Arquer, F., et al., "CO2 electrolysis to multicarbon products at activities greater than 1 A cm-2," Science 367 (Feb. 7, 2020), pp. 661-666.

(Continued)

*Primary Examiner* — Salil Jain
(74) *Attorney, Agent, or Firm* — Foley & Lardner LLP

(57) ABSTRACT

System and method relates to an advanced manufactured vapor-fed electrochemical reactor (AM-VFR) system comprising a cathode gas compartment comprising a first inlet, and a first outlet, a catholyte compartment having a centrally located window for a cathode and a membrane, a second inlet, a second outlet, and a reference electrode, an anolyte compartment having a centrally located window for the membrane and an anode, a third inlet and a third outlet and an anode gas compartment having a fourth inlet and a fourth outlet, wherein the cathode, wherein the cathode is disposed between the cathode gas compartment and the catholyte compartment, wherein the membrane is disposed between the catholyte compartment and the anolyte compartment, wherein the anode is disposed between the anolyte compartment and the anode gas compartment, and wherein one or more of the cathode gas compartment, the catholyte compartment, the anolyte compartment and the anode gas compartment are made of a 3D printing plastic. Methods for making and using the system are also disclosed.

26 Claims, 25 Drawing Sheets

(51) Int. Cl.
| | |
|---|---|
| B33Y 10/00 | (2015.01) |
| B33Y 80/00 | (2015.01) |
| C25B 1/00 | (2021.01) |
| C25B 1/01 | (2021.01) |
| C25B 1/135 | (2021.01) |
| C25B 1/23 | (2021.01) |
| C25B 1/50 | (2021.01) |
| C25B 3/26 | (2021.01) |
| C25B 9/19 | (2021.01) |
| C25B 11/04 | (2021.01) |
| C25B 11/055 | (2021.01) |
| C25B 11/075 | (2021.01) |
| C25B 15/08 | (2006.01) |

(52) U.S. Cl.
CPC ............... *C25B 1/135* (2021.01); *C25B 1/23* (2021.01); *C25B 1/50* (2021.01); *C25B 3/26* (2021.01); *C25B 9/19* (2021.01); *C25B 11/04* (2013.01); *C25B 11/055* (2021.01); *C25B 11/075* (2021.01); *C25B 15/08* (2013.01); *B29C 64/124* (2017.08); *B33Y 10/00* (2014.12)

(56) References Cited

OTHER PUBLICATIONS

Dinh, C., et al., "CO2 electroreduction to ethylene via hydroxide-mediated copper catalysis at an abrupt interface," Science, vol. 360 (May 18, 2018), pp. 783-787.

Gabardo, C., et al., "Continuous Carbon Dioxide Electroreduction to Concentrated Multi-carbon Products Using a Membrane Electrode Assembly," Joule, vol. 3 (Nov. 20, 2019), pp. 1-15.

Hoang, T., et al., "Nanoporous Copper-Silver Alloys by Additive-Controlled Electrodeposition for the Selective Electroreduction of CO2 to Ethylene and Ethanol," J. Am. Chem. Soc.

Hoang, T., et al., "Nanoporous Copper Films by Additive-Controlled Electrodeposition: CO2 Reduction Catalysis," Am. Chem. Soc., vol. 7 (2017), pp. 3313-3321.

Li, F., et al., "Molecular tuning of CO2-to-ethylene conversion," Nature, vol. 577 (Jan. 23, 2020) pp. 509-514.

Li, Y., et al., "Binding Site Diversity Promotes CO2 Electroreduction to Ethanol," J. Am. Chem. Soc., vol. 141 (2019), pp. 8584-8591.

Luo, M., et al., "Hydroxide promotes carbon dioxide electroreduction to ethanol on copper via tuning of adsorbed hydrogen," Nature Comm. (2019).

Lv, J., et al., "A Highly Porous Copper Electrocatalyst for Carbon Dioxide Reduction," Adv. Mater., vol. 30 (2018), pp. 1-8.

Ma, M., et al., "Insights into the carbon balance for CO2 electroreduction on Cu using gas diffusion electrode reactor designs," Energy Environ. Sci., Feb. 12, 2020, pp. 1-9.

Ma, S., et al., "One-step electrosynthesis of ethylene and ethanol from CO2 in an alkaline electroyzer," Journal of Power Sources, vol. 301 (2016), pp. 219-228.

Ma, W., et al., "Electrocatalytic reduction of CO2, to ethylene and ethanol through hydrogen-assisted C—C coupling over fluorine-modified copper," Nature Catalysis, vol. 3, Jun. 2020, pp. 478-487.

Perry, S., et al., "Polymers with intrinsic microporosity (PIMs) for targeted CO2 reduction to ethylene," Chemosphere 248 (2020), pp. 1-9.

Tan, Y., et al., "Modulating Local CO2 Concentration as a General Strategy for Enhancing C—C Coupling in CO2 Electroreduction," Joule 4 (May 20, 2020), p. 1-17.

Wang, Y., et al., "Catalyst synthesis under CO2 electroreduction favours faceting and promotes renewable fuels electrosynthesis," Nature Catalysis, vol. 3, Feb. 2020, pp. 98-106.

Wang, Y., et al., "Copper Nanocubes for CO2 Reduction in Gas Diffusion Electrodes," Nano Lett. (2019), vol. 19, pp. 8461-8468.

Wang, X., et al., "Efficient electrically powered CO2-to-ethanol via suppression of deoxygenation," Nature Energy, vol. 5, Jun. 2020, pp. 478-486.

Yang, P., et al., "Protecting Copper Oxidation State via Intermediate Confinement for Selective CO2 Electroreduction to C2 Fuels," J. Am. Chem.Soc. 2020, 142, 6400-6408.

Zhuang, T., et al., "Steering post-C—C coupling selectivity enables high efficiency electroreduction of carbon dioxide to multi-carbon alcohols," Nature Catalysis, vol. 1 (Jun. 2018), pp. 421-428.

Corral, D. et al., "Advanced manufacturing for electrosynthesis of fuels and chemicals from CO2", Energy & environmental science, 2021 (first published: Feb. 15, 2021), vol. 14, No. 5, pp. 3064-3074.

International Search Report and Written Opinion on PCT/US2021/048723 dated Dec. 23, 2021, 11 pages.

Lobaccaro, P. et al., "Effects of temperature and gas-liquid mass transfer on the operation of small electrochemical cells for the quantitative evaluation of CO2 reduction electrocatalysts", Physical chemistry chemical physics: PCCP, 2016, vol. 18, No. 38, pp. 26777-26785.

Weekes, D.M. et al., "Electrolytic CO2 reduction in a flow cell", Accounts of chemical research, 2018, vol. 51, No. 4, pp. 910-918.

Endrodi et al., "Continuous-flow electroreduction of carbon dioxide," Progress in Energy and Combustion Science, 62:133-154 (Jun. 13, 2017).

Extended European Search Report on EP 21865057.0 DTD Aug. 29, 2024, 8 pages.

Li et al., "Supplemental Information—Molecular tuning of CO2-to-ethylene conversion," Nature, vol. 577, 68 pages (Nov. 20, 2019).

* cited by examiner

Table 1A: Exemplary Chemical Reactions for AM-VFR Reactor

| Full Reaction | Cathode Reaction | Anode Reaction |
|---|---|---|
| $CO_2 \rightarrow CO + \frac{1}{2}O_2$ | $CO_2 + H_2O + 2e^- \rightarrow CO + 2OH^-$ | $2OH^- \rightarrow \frac{1}{2}O_2 + H_2O + 2e^-$ |
| $CO_2 + H_2O \rightarrow HCOOH + \frac{1}{2}O_2$ | $CO_2 + 2H_2O + 2e^- \rightarrow HCOOH + 2OH^-$ | $2OH^- \rightarrow \frac{1}{2}O_2 + H_2O + 2e^-$ |
| $CO_2 + 2H_2O \rightarrow CH_3OH + (3/2)O_2$ | $CO_2 + 5H_2O + 6e^- \rightarrow CH_3OH + 6OH^-$ | $6OH^- \rightarrow (3/2)O_2 + 3H_2O + 6e^-$ |
| $CO_2 + 2H_2O \rightarrow CH_4 + 2O_2$ | $CO_2 + 6H_2O + 8e^- \rightarrow CH_4 + 8OH^-$ | $8OH^- \rightarrow 2O_2 + 4H_2O + 6e^-$ |
| $2CO_2 + 2H_2O \rightarrow C_2H_4O_2 + 2O_2$ | $2CO_2 + 6H_2O + 8e^- \rightarrow C_2H_4O_2 + 8OH^-$ | $8OH^- \rightarrow 2O_2 + 4H_2O + 8e^-$ |
| $2CO_2 + 2H_2O \rightarrow C_2H_4O + (5/2)O_2$ | $2CO_2 + 7H_2O + 10e^- \rightarrow C_2H_4O + 10OH^-$ | $10OH^- \rightarrow (5/2)O_2 + 5H_2O + 10e^-$ |
| $2CO_2 + 2H_2O \rightarrow C_2H_4 + 3O_2$ | $2CO_2 + 8H_2O + 12e^- \rightarrow C_2H_4 + 12OH^-$ | $12OH^- \rightarrow 3O_2 + 6H_2O + 12e^-$ |
| $2CO_2 + 3H_2O \rightarrow C_2H_5OH + 3O_2$ | $2CO_2 + 9H_2O + 12e^- \rightarrow C_2H_5OH + 12OH^-$ | $12OH^- \rightarrow 3O_2 + 6H_2O + 12e^-$ |
| $3CO_2 + 4H_2O \rightarrow C_3H_7OH + (9/2)O_2$ | $3CO_2 + 13H_2O + 18e^- \rightarrow C_3H_7OH + 18OH^-$ | $18OH^- \rightarrow (9/2)O_2 + 9H_2O + 18e^-$ |
| $H_2O \rightarrow H_2 + \frac{1}{2}O_2$ | $2H_2O + 2e^- \rightarrow H_2 + 2OH^-$ | $2OH^- \rightarrow \frac{1}{2}O_2 + H_2O + 2e^-$ |

FIG. 4A

Table 1B: Exemplary Possible Chemical Reactions for AM-VFR Reactor

| Possible Reactions |
|---|
| $O_2 \dashrightarrow H_2O$ |
| $H_2 \dashrightarrow H^+$ |
| $CO \dashrightarrow CH_3OH + O_2$ |
| $CO \dashrightarrow CH_4 + O_2$ |
| $2CO \dashrightarrow C_2H_4O_2 + O_2$ |
| $2CO \dashrightarrow C_2H_4O + O_2$ |
| $2CO \dashrightarrow C_2H_4 + O_2$ |
| $2CO \dashrightarrow C_2H_5OH + O_2$ |
| $3CO \dashrightarrow C_3H_7OH + O_2$ |
| $CH_4 \dashrightarrow CO_2$ |

FIG. 4B

Table 1C: Exemplary Possible Chemical Reactions for AM-VFR Reactor — 400

Possible Reactions

- Oxygen reduction (to $H_2O$)
- Hydrogen oxidation
- Methane oxidation (to $CO_2$)
- Carbon monoxide reduction (to all products that were listed before)

FIG. 4C

ADVANCED MANUFACTURED VAPOR-FED ELECTROCHEMICAL REACTOR (AM-VFR) FOR IMPROVED PERFORMANCE FOR ELECTROCHEMICAL CONVERSION

FEDERALLY SPONSORED RESEARCH STATEMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD OF DISCLOSURE

The disclosure relates to electrochemical reactors, and, in particular, to an advanced manufactured electrochemical reactor (AM-VFR).

BACKGROUND

The increasing rate of greenhouse gas (GHG) emissions into the atmosphere necessitates the development of methods to reduce carbon emissions. Significant efforts have been taken to develop carbon utilization technologies; these methods focus on converting $CO_2$ into a myriad of valuable products. Electrochemical conversion of $CO_2$ ($CO_2R$) is a promising approach to carbon utilization due to the ability to run these systems at ambient temperatures and pressures. Furthermore, $CO_2R$ can be combined with renewable sources of electricity (e.g., wind, solar) to drive a process that is net carbon negative.

The vast majority of $CO_2R$ studies have taken place in two classes of electrochemical cells: liquid-fed reactors (LFRs) and vapor-fed reactors (VFRs). LFRs, which include H-cells and flow cells, depend on the dissolution and diffusion of $CO_2$ through a liquid electrolyte. As such, they become limited by the rate of $CO_2$ mass transport to the electrocatalyst surface, which often prevents high $CO_2R$ current densities from being achieved. Comparatively, VFRs exhibit increased mass transport of $CO_2$ to the electrocatalyst surface because diffusion of $CO_2$ in the gas phase is three orders of magnitude higher than in the aqueous phase. VFRs typically include aqueous electrolyte cells, sometimes referred to as gas diffusion electrode (GDE) cells, and polymer electrolyte cells, which are often referred to as membrane electrode assemblies or MEA cells. While much progress has been made to understand and advance $CO_2R$ in both classes of reactors, a large focus has been placed on changing and controlling the electrocatalyst in these systems.

Therefore, there is a need for an advanced manufactured vapor-fed electrochemical reactor (AM-VFR) with higher selectivity for multi-carbon (C2+) products than existing $CO_2R$ systems and with a high single pass conversion of CO in neutral electrolytes.

SUMMARY OF THE DISCLOSURE

Applicant has developed 3D-printing and advanced manufacturing techniques for use in a variety of applications, for example electrochemical reactor design. In one aspect, this disclosure describes an advanced manufactured vapor-fed electrochemical reactor (AM-VFR) to convert, for example, $CO_2$ from a variety of sources and concentrations to valuable hydrocarbon products, such as ethylene ($C_2H_4$), and alcohols, such as ethanol ($C_2H_5OH$) and propanol ($C_3H_7OH$). In neutral electrolytes, the AM-VFR reactor achieves higher selectivity for multi-carbon (C2+) products than existing $CO_2R$ systems, and a high single-pass conversion of CO.

In an embodiment, an advanced manufactured vapor-fed electrochemical reactor (AM-VFR) system comprises, or consists essentially of, or consists of a cathode gas compartment, a catholyte compartment, and anolyte compartment and an anodes gas compartment. One or more of the cathode gas compartment, the catholyte compartment, the anolyte compartment and the anode gas compartment are made of a 3D printing plastic.

The cathode gas compartment has a first inlet, and a first outlet. In an embodiment, the first inlet of the cathode gas compartment and the fourth inlet of the anode gas compartment are feed inlets for one or more of one or more of $CH_4$, $CO_2$, CO, $H_2$, $H_2O$ and $O_2$.

The catholyte compartment has a centrally located window for a cathode and a membrane, a second inlet, a second outlet, and a reference electrode. In an embodiment, the cathode comprises an electrocatalyst and a support. In an embodiment, the electrocatalyst is one or more of Ag, Au, Cu, Fe, $IrO_2$, Ni, Pd, Pt, Sn, metal alloys and metal oxides. In an embodiment, the support is one or more of a fluorinated ethylene propylene (FEP), a perfluoroalkoxy alkane (PFA), a polychlorotrifluoroethylene (PCTFE), an ethylene chlorotrifluoroethylene (ECTFE) and a polytetrafluoroethylene (PTFE). In an embodiment, the cathode comprises, consists essentially of or consists of Cu-polytetrafluoroethylene (PTFE).

In an embodiment, the cathode has a cathode geometric current density from about 35 $mA/cm^2$ to about 500 $mA/cm^2$, and any range or value there between. In an embodiment, the cathode has a cathode geometric current density of from about 200 $mA/cm^2$ to about 500 $mA/cm^2$.

The anolyte compartment has a centrally located window for the membrane and an anode, a third inlet and a third outlet.

The anode gas compartment has a fourth inlet and a fourth outlet.

In an embodiment, the cathode is disposed between the cathode gas compartment and the catholyte compartment.

In an embodiment, the membrane is disposed between the catholyte compartment and the anolyte compartment.

In an embodiment, the anode is disposed between the anolyte compartment and the anode gas compartment.

In an embodiment, the cathode, the membrane and the anode have a geometric surface area from about 1 $cm^2$ to about 100 $cm^2$, and any range or value there between.

In an embodiment, a method of using an advanced manufactured vapor-fed electrochemical reactor (AM-VFR) comprises fluidly connecting a feed to the AM-VFR reactor as described herein, wherein the AM-VFR reactor is fluidly connected to a feed and a buffer to produce a product.

In an embodiment, a cathode has a cathode geometric current density from about 35 $mA/cm^2$ to about 500 $mA/cm^2$, and any range or value there between. In an embodiment, the cathode has a cathode geometric current density from about 200 $mA/cm^2$ to about 500 $mA/cm^2$.

In an embodiment, the feed is one or more of $CH_4$, $CO_2$, CO, $H_2$, $H_2O$ and $O_2$. In an embodiment, the feed is $CO_2$. In an embodiment, the feed comprises, or consists essentially of or yet further consisting of CO.

In an embodiment, the feed has a flow rate of <about 50 sccm, and any range or value there between. In an embodiment, the feed has a flow rate of <about 15 sccm. In an embodiment, the feed has a flow rate of <about 5 sccm.

In an embodiment, the buffer is from about 0.1 M to about 1 M $HCO_3$ in water, and any range or value there between.

In an embodiment, the buffer has a flow rate of <about 100 mL/min, and any range or value there between.

In an embodiment, the product is one or more of $CH_4$, $CH_3OH$, $CO_2$, CO, $C_2H_4$, $C_2H_4O$, $C_2H_4O_2$, $C_2H_5OH$, $C_3H_7OH$, HCOOH, H+, $H_2$, $H_2O$ and $O_2$. In an embodiment, the product is one or more of $C_2H_4$, $C_2H_5OH$ and $O_2$.

In an embodiment, a method of making an advanced manufactured vapor-fed electrochemical reactor (AM-VFR) comprises printing one or more of a cathode gas compartment, a catholyte compartment, an anolyte compartment and an anode gas compartment of the AM-VFR reactor using a 3D printing technique, and assembling the AM-VFR reactor.

In an embodiment, the 3D printing technique is a stereolithography (SLA) 3D printing technique, an extrusion 3D printing technique or a selective laser sintering 3D printing technique. In an embodiment, the 3D printing technique is a stereolithography (SLA) 3d printing technique.

In an embodiment, a cathode is disposed between the cathode gas compartment and the catholyte compartment.

In an embodiment, a membrane is disposed between the catholyte compartment and the anolyte compartment.

In an embodiment, an anode is disposed between the anolyte compartment and the anode gas compartment.

In an embodiment, the method further comprises fluidly connecting a plurality of AM-VFR reactors in parallel to increase productivity.

In an embodiment, the method further comprises comprising fluidly connecting a plurality of AM-VFR reactors in series to improve conversion.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present disclosure, reference should be made to the following detailed disclosure, taken in conjunction with the accompanying drawings, in which like parts are given like reference numerals, and wherein:

FIG. 4A illustrates a table of exemplary chemical reactions for the AM-VFR reactor according to an embodiment of the disclosure;

FIG. 4B illustrates a table of exemplary possible reactions for the AM-VFR reactor according to an embodiment of the present disclosure;

FIG. 4C illustrates a table of exemplary possible reactions for the AM-VFR reactor according to an embodiment of the present disclosure;

DETAILED DESCRIPTION

The following detailed description of various embodiments of the present disclosure references the accompanying drawings, which illustrate specific embodiments in which the invention can be practiced. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains. Therefore, the scope of the present disclosure is defined only by the appended claims, along with the full scope of equivalents to which such claims are entitled.

Advanced Manufactured Vapor-Fed Electrochemical Reactor (AM-VFR)

Figure 1A:
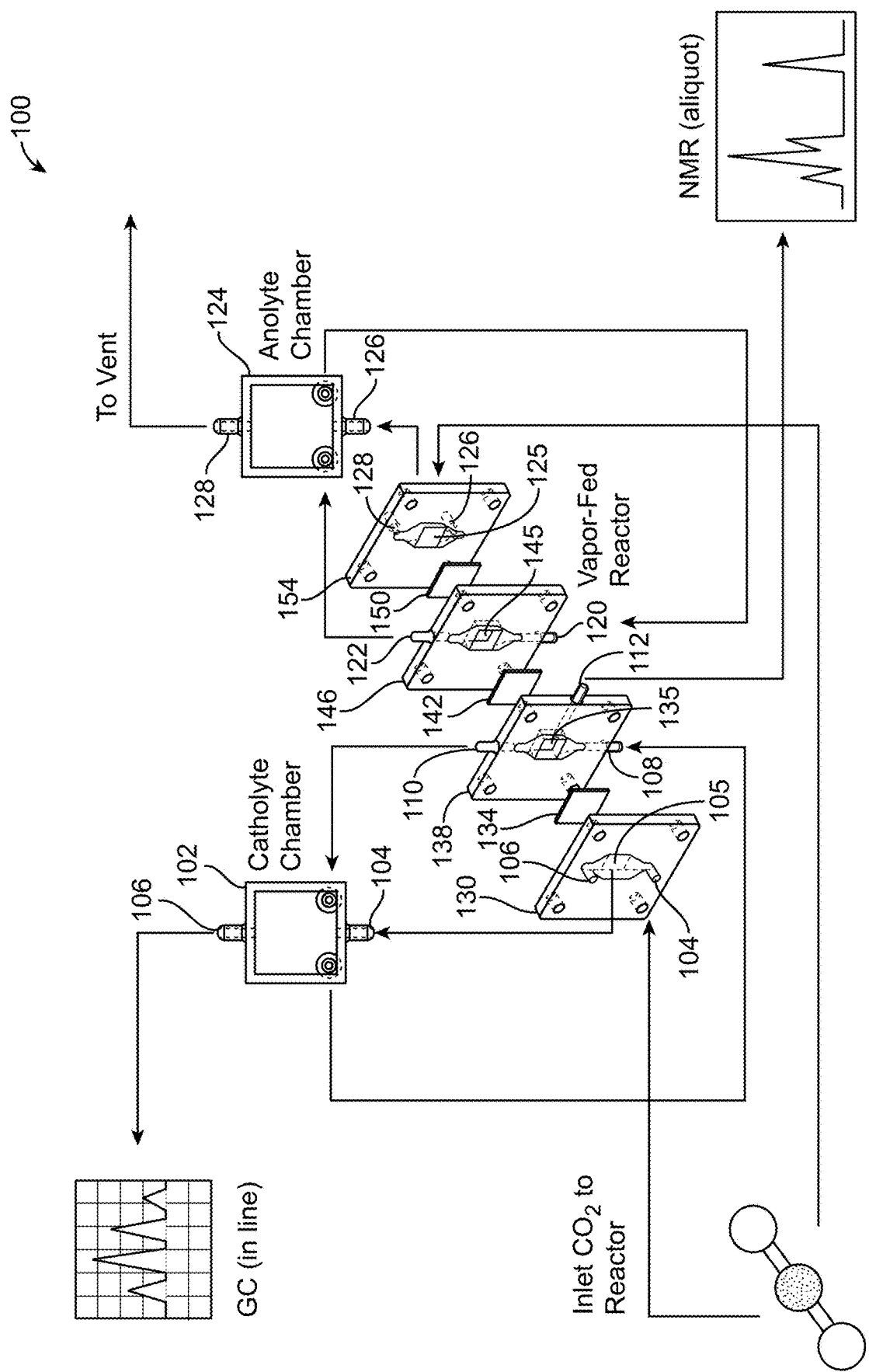
FIG. 1A illustrates an exemplary process flow diagram for an advanced manufactured vapor-fed electrochemical reactor (AM-VFR) according to an embodiment of the disclosure.
Figure 1B:
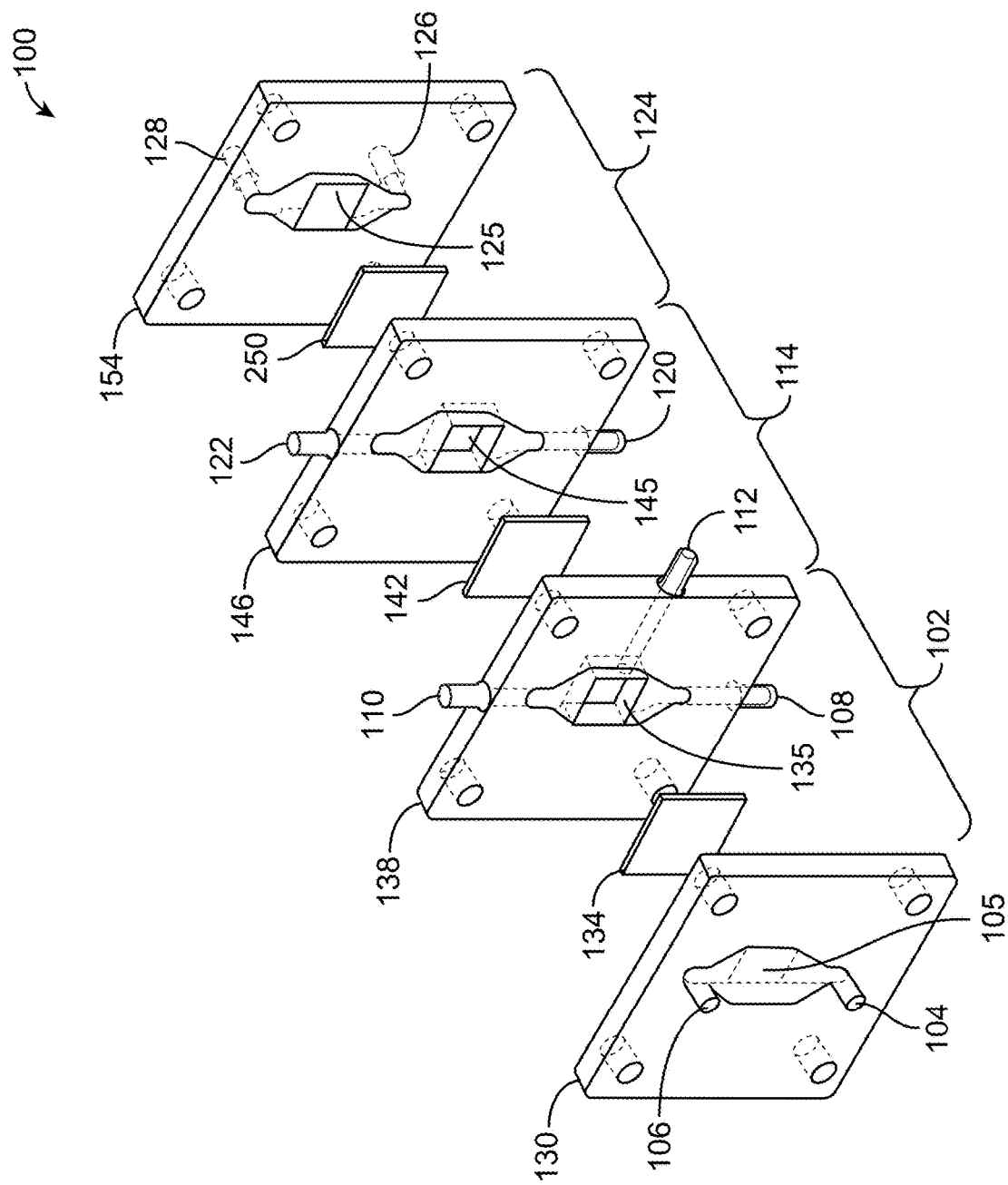
FIG. 1B illustrates an exploded view of the AM-VFR reactor of FIG. 1A, showing a cathode gas compartment, a catholyte compartment, an anolyte compartment and an anode gas compartment.

FIG. 1A illustrates an exemplary process flow diagram for an advanced manufactured vapor-fed electrochemical reactor (AM-VFR) 100 according to an embodiment of the disclosure; and FIG. 1B illustrates an exploded view of the AM-VFR reactor 100 of FIG. 1A, showing a cathode gas compartment 130, a catholyte compartment 138, an anolyte compartment 146, and an anode gas compartment 154.

Figure 2:
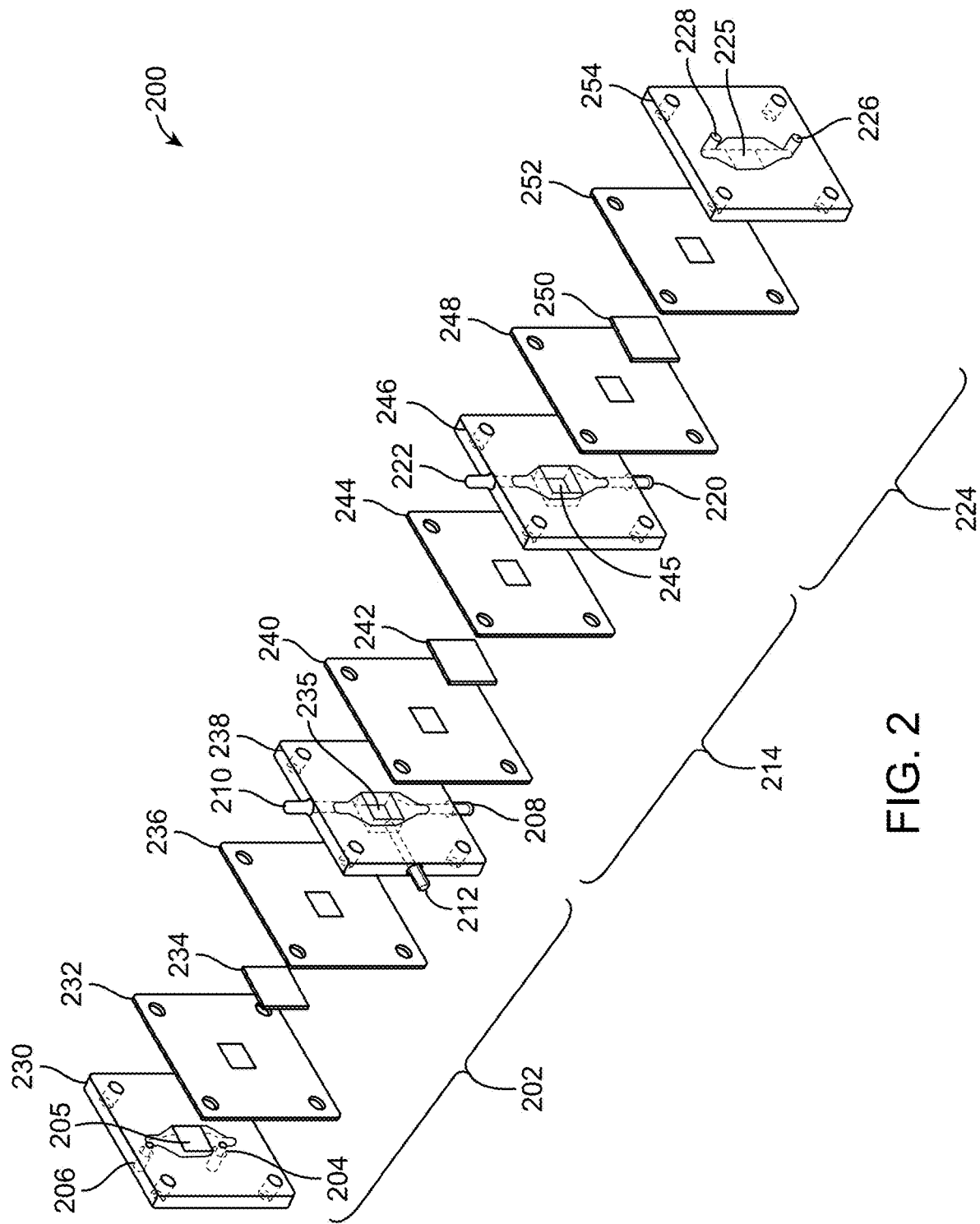
FIG. 2 illustrates an exploded view of an AM-VFR reactor according to an embodiment of the disclosure, showing a cathode gas compartment, a catholyte compartment, an anolyte compartment and an anode gas compartment.

FIG. 2 illustrates an exploded view of the AM-VFR reactor according to an embodiment of the disclosure, showing a cathode gas compartment, a catholyte compartment, an anolyte compartment and an anode gas compartment.

Cathode Gas Chamber

As shown in FIGS. 1A-1B and 2, a catholyte chamber 102, 202 comprises a cathode gas compartment 130, 230, a cathode 134, 234 and a catholyte compartment 138, 238. The cathode 134, 234 may be disposed between the cathode gas compartment 130, 230 and the catholyte compartment 138, 238.

In an embodiment, a first gasket 232 may be disposed between the cathode gas compartment 130, 230 and the cathode 134, 234.

In an embodiment, a second gasket 236 may be disposed between the cathode 134, 234 and the catholyte compartment 138, 238.

In an embodiment, the cathode gas compartment 130, 230 comprises a first inlet 104, 204 to the catholyte chamber 102, 202 and a first outlet 106, 206 from the catholyte chamber 102, 202.

In an embodiment, the cathode gas compartment 130, 230 comprises a centrally located window (opening) 105, 205 for the cathode 134, 234. In an embodiment, the centrally located window (opening) 105, 205 for the cathode 134, 234 has a geometric surface area for the cathode 134, 234.

The centrally located window (opening) 105, 205 for the cathode 134, 234 of the cathode gas compartment 130, 230 may be any suitable size (e.g., geometric surface area). For example, a suitable geometric surface area for the cathode 134, 234 includes, but is not limited to, from about a 1 cm$^2$ to about 100 cm$^2$, and any range or value there between.

In an embodiment, the geometric surface area for the cathode 134, 234 is about 1 cm$^2$.

In an embodiment, the cathode 134, 234 comprises an electrocatalyst and a support.

The centrally located window (opening) 105, 205 for the cathode 134, 234 of the cathode gas compartment 130, 230 may be any suitable shape. For example, a suitable shape includes, but is not limited to, a cylinder, a rectangular prism (e.g., cube, cuboid), and combinations and/or portions thereof.

In an embodiment, the shape is a cylinder.

In an embodiment, the shape is a rectangular prism (e.g., cube, cuboid)

The electrocatalyst may be any suitable electrocatalyst. For example, a suitable electrocatalyst includes, but is not limited to Ag, Au, Cu, Fe, $IrO_2$, Ni, Pd, Pt, Sn, metal alloys, metal oxides, and combinations thereof.

The support may any suitable electrocatalyst support. For example, a suitable support includes, but is not limited to, a fluorinated ethylene propylene (FEP), a perfluoroalkoxy alkane (PFA), a polychlorotrifluoroethylene (PCTFE), an ethylene chlorotrifluoroethylene (ECTFE), a polytetrafluoroethylene (PTFE), and combinations thereof.

In an embodiment, the cathode 134, 234 may be a Cu-PTFE.

In an embodiment, a cathode geometric current density may be from about 35 mA/cm$^2$ to about 500 mA/cm$^2$, and any range or value there between. In an embodiment, the cathode current density may be from about 200 mA/cm$^2$ to about 500 mA/cm$^2$.

In an embodiment, the catholyte compartment 138, 238 comprises a centrally located window (opening) 135, 235 for the cathode 134, 234. In an embodiment, the centrally located window (opening) 135, 235 for the cathode 134, 234 has a geometric surface area for the cathode 134, 234.

The centrally located window (opening) 135, 235 for the cathode 134, 234 of the catholyte compartment 138, 238 may be any suitable size (e.g., geometric surface area). For example, a suitable geometric surface area for the cathode 134, 234 includes, but is not limited to, from about a 1 cm$^2$ to about 100 cm$^2$, and any range or value there between.

In an embodiment, the geometric surface area for the cathode 134, 234 is about 1 cm$^2$.

The centrally located window (opening) 135, 235 for the cathode 134, 234 of the catholyte compartment 138, 238 may be any suitable shape. For example, a suitable shape includes, but is not limited to, a cylinder, a rectangular prism (e.g., cube, cuboid), and combinations and/or portions thereof.

In an embodiment, the shape is a cylinder.

In an embodiment, the shape is a rectangular prism (e.g., cube, cuboid)

In an embodiment, the catholyte compartment 138, 238 comprises a second inlet 108, 208 to the catholyte chamber 102, 202 and a second outlet 110, 210 from the catholyte chamber 102, 202.

In an embodiment, the catholyte compartment 138, 238 comprises a reference electrode 112, 212.

The reference electrode 112, 212 may be any suitable reference electrode. For example, a suitable reference electrode 112, 212 includes, but is not limited to, a saturated calomel reference electrode (SCE), a silver/silver chloride reference electrode (Ag/AgCl), mercury/mercurous sulfate reference electrode ($Hg/Hg_2SO_4$), mercury/mercury oxide reference electrode (Hg/HgO), a reversible hydrogen electrode reference electrode (RHE), and silver/silver nitrate non-aqueous reference electrode (Ag/Ag+).

In an embodiment, the reference electrode 112, 212 may be a silver/silver chloride reference electrode (Ag/AgCl). In an embodiment, the reference anode 112, 212 may be a reversible hydrogen electrode reference electrode (RHE).

Vapor-Fed Reactor

A vapor-fed reactor 114, 214 comprises a catholyte compartment 138, 238, a membrane 142, 242 and an anolyte compartment 146, 246. The membrane 142, 242 may be disposed between the catholyte compartment 138, 238 and the anolyte compartment 146, 246.

In an embodiment, a third gasket 240 may be disposed between the catholyte compartment 138, 238 and the membrane 142, 242.

In an embodiment, a fourth gasket 244 may be disposed between the membrane 142, 242 and the anolyte compartment 146, 246.

In an embodiment, the catholyte compartment 138, 238 comprises a second inlet 108, 208, to the catholyte chamber 102, 202 and a second outlet 110, 210 from the catholyte chamber 102, 202.

In an embodiment, the catholyte compartment 138, 238 comprises a reference electrode 112, 212.

The reference electrode 112, 212 may be any suitable reference electrode. For example, a suitable reference electrode 112, 212 includes, but is not limited to, a saturated calomel reference electrode (SCE), a silver/silver chloride reference electrode (Ag/AgCl), mercury/mercurous sulfate reference electrode (Hg/Hg$_2$SO$_4$), mercury/mercury oxide reference electrode (Hg/HgO) and silver/silver nitrate non-aqueous reference electrode (Ag/Ag+).

In an embodiment, the catholyte compartment 138, 238 comprises a centrally located window (opening) 135, 235 for the membrane 142, 242. In an embodiment, the centrally located window (opening) 135, 235 for the membrane 142, 242 has a geometric surface area for the membrane 142, 242.

The centrally located window (opening) 135, 235 for the membrane 142, 242 of the catholyte compartment 138, 238 may be any suitable size (e.g., geometric surface area). For example, a suitable geometric surface area for the membrane 142, 242 includes, but is not limited to, from about 1 cm$^2$ to about 100 cm$^2$ surface area, and any range or value there between.

In an embodiment, the geometric surface area for the membrane 142, 242 is about 1 cm$^2$.

The centrally located window (opening) 135, 235 for the membrane 142, 242 of the catholyte compartment 138, 238 may be any suitable shape. For example, a suitable shape includes, but is not limited to, a cylinder, a rectangular prism (e.g., cube, cuboid), and combinations and/or portions thereof.

In an embodiment, the shape is a cylinder.

In an embodiment, the shape is a rectangular prism (e.g., cube, cuboid).

The membrane 142, 242 may be any suitable ion-exchange membrane. For example, a suitable membrane 142, 242 includes, but is not limited to, any anion exchange membrane, any cation exchange membrane, any bipolar exchange membrane, and combinations thereof.

In an embodiment, the membrane 142, 242 is a commercially available anion exchange membrane (e.g., Sustainion®).

In an embodiment, the anolyte compartment 146, 246 comprises a first inlet 116, 216 (in through membrane 142, 242) to the vapor-fed reactor 114, 214 and a first outlet 118, 218 (out through membrane 142, 242) from the vapor-fed reactor 114, 214.

In an embodiment, the anolyte compartment 146, 246 comprises a second inlet 120, 220 to the anolyte chamber 124, 224 and a second outlet 122, 222 from the anolyte chamber 124, 224.

In an embodiment, the anolyte compartment 146, 246 comprises a centrally located window (opening) 145, 245 for the membrane 142, 242. In an embodiment, the centrally located window (opening) 145, 245 for the membrane 142, 242 has a geometric surface area for the membrane 142, 242.

The centrally located window (opening) 145, 245 for the membrane 142, 242 of the anolyte compartment 146, 246 may be any suitable size (e.g., geometric surface area). For example, a suitable geometric surface area for the membrane 142, 242 includes, but is not limited to, from about 1 cm$^2$ to about 100 cm$^2$, and any range or value there between.

In an embodiment, the geometric surface area for the membrane 142, 242 is about 1 cm$^2$.

The centrally located window (opening) 145, 245 for the membrane 142, 242 of the anolyte compartment 146, 246 may be any suitable shape. For example, a suitable shape includes, but is not limited to, a cylinder, a rectangular prism (e.g., cube, cuboid), and combinations and/or portions thereof.

In an embodiment, the shape is a cylinder.

In an embodiment, the shape is a rectangular prism (e.g., cube, cuboid)

Anolyte Chamber

An anolyte chamber 124, 224 comprises an anolyte compartment 146, 246, an anode 150, 250 and an anode gas compartment 154, 254. The anode 150, 250 may be disposed between the anolyte compartment 146, 246 and the anode gas compartment 154, 254.

In an embodiment, a fifth gasket 248 may be disposed between the anolyte compartment 146, 246 and the anode 150, 250.

In an embodiment, a sixth gasket 252 may be disposed between the anode 150, 250 and the anode gas compartment 154, 254.

In an embodiment, the anolyte compartment 146, 246 comprises a second inlet 120, 220 to the anolyte chamber 124, 214 and a second outlet 122, 222 from the anolyte chamber 124, 224.

In an embodiment, the anolyte compartment 146, 246 comprises a centrally located window (opening) 145, 245 for the anode 150, 250. In an embodiment, the centrally located window (opening) 145, 245 for the anode 150, 250 has a geometric surface area for the anode 150, 250.

The centrally located window (opening) 145, 245 for the anode 150, 250 of the anolyte compartment 146, 246 may be any suitable size (e.g., geometric surface area). For example, a suitable geometric surface area for the anode 150, 250 includes, but is not limited to, from about 1 cm$^2$ to about 100 cm$^2$, and any range or value there between.

In an embodiment, the geometric surface area for the anode 150, 250 is about 1 cm$^2$.

The centrally located window (opening) 145, 245 for the anode 150, 250 of the anolyte compartment 146, 246 may be any suitable shape. For example, a suitable shape includes, but is not limited to, a cylinder, a rectangular prism (e.g., cube, cuboid), and combinations and/or portions thereof.

In an embodiment, the shape is a cylinder.

In an embodiment, the shape is a rectangular prism (e.g., cube, cuboid)

The anode 150, 250 may be any suitable anode. For example, a suitable anode 150, 250 includes, but is not limited to, an IrO-carbon, Ni foam, Pt-carbon, and combinations thereof.

In an embodiment, the anode 150, 250 is a commercially available IrO-carbon anode.

In an embodiment, the anode gas compartment 154, 254 comprises a first inlet 126, 226 to the anolyte chamber 124, 224 and a first outlet 128, 228 from the anolyte chamber 124, 224.

In an embodiment, the anode gas compartment 154, 254 comprises a centrally located window (opening) 125, 145 for the anode 150, 250. In an embodiment, the centrally located window (opening) 125, 145 for the anode 150, 250 has a geometric surface area for the anode 150, 250.

The centrally located window (opening) 125, 145 for the anode 150, 250 of the anode gas compartment 154, 254 may be any suitable size (e.g., geometric surface area). For example, a suitable geometric surface area for the anode 150, 250 includes, but is not limited to, from about 1 cm$^2$ to about 100 cm$^2$, and any range or value there between.

In an embodiment, the geometric surface area for the anode 150, 250 is about 1 cm².

The centrally located window (opening) 125, 145 for the anode 150, 250 of the anode gas compartment 154, 254 may be any suitable shape. For example, a suitable shape includes, but is not limited to, a cylinder, a rectangular prism (e.g., cube, cuboid), and combinations and/or portions thereof.

In an embodiment, the shape is a cylinder.

In an embodiment, the shape is a rectangular prism (e.g., cube, cuboid)

In an embodiment, the cathode gas compartment 130, 230, the catholyte compartment 138, 238, the anolyte compartment 146, 246 and the anode gas compartment 154, 254 may any suitable shape. For example, a suitable shape includes, but is not limited to, a cylinder, a rectangular prism (e.g., cube, cuboid), and combinations and/or portions thereof.

In an embodiment, the shape is a cylinder.

In an embodiment, the shape is a rectangular prism (e.g., cube, cuboid).

In an embodiment, the cathode gas compartment 130, 230, the catholyte compartment 138, 238, the anolyte compartment 146, 246 and the anode gas compartment 154, 254 may any suitable size. For example, a suitable size includes, but is not limited to, from about 4 cm² to about 120 cm², and any range or value there between.

In an embodiment, the shape is a cylinder and the size is from about 0.6 cm in diameter to about 40 cm in diameter.

In an embodiment, the shape is a rectangular prism and the size is from about 2 cm long×about 2 cm wide to about 10.1 cm long×about 10.1 cm wide.

In an embodiment, the shape is rectangular prism and the size may be about 6 cm×6 cm.

In an embodiment, the cathode gas compartment 130, 230, the catholyte compartment 138, 238, the anolyte compartment 146, 246 and the anode gas compartment 154, 254 may any suitable thickness. For example, a suitable thickness includes, but is not limited to, from about 0.1 cm to about 10 cm, and any range or value there between.

In an embodiment, the thickness may be about 1.5 cm.

In an embodiment, a plurality of the AM-VFR reactors may be fluidly connected to form a stack. In an embodiment, the plurality of AM-VFR reactors may be fluidly connected in parallel to increase productivity. In an embodiment, the plurality of AM-VFR reactors may be fluidly connected in series to increase conversion.

In an embodiment, the first gasket 232, the second gasket 236, the third gasket 240, the fourth gasket 244, the fifth gasket 248 and the sixth gasket 252 may be made of any suitable plastic or polymer capable of sealing the AM-VFR. For example, a suitable plastic or polymer includes, but is not limited to, an ethylene chlorotrifluoroethylene (ECTFE), a fluorinated ethylene propylene (FEP), a nylon, a perfluoroalkoxy alkane (PFA), a polychlorotrifluoroethylene (PCTFE), a polytetrafluoroethylene (PTFE), a polysiloxane, a silicone, and combinations thereof.

In an embodiment, the first gasket 232, the second gasket 236, the third gasket 240, the fourth gasket 244, the fifth gasket 248 and the sixth gasket 252 may be made of polysiloxane.

In an embodiment, the first gasket 232, the second gasket 236, the third gasket 240, the fourth gasket 244, the fifth gasket 248 and the sixth gasket 252 may be made of silicone.

In an embodiment, the cathode gas compartment 130, 230, the catholyte compartment 138, 238, the anolyte compartment 146, 246 and the anode gas compartment 154, 254 may be made of any suitable plastic capable of withstanding chemical reaction conditions. For example, a suitable plastic includes, but is not limited to acrylonitrile butadiene styrene (ABS), carbon fiber, nylon, polyacrylate, polycarbonate, polyethylene (PE, HDPE), polyethylene terephthalate (PETG), polypropylene (PP, HDPP), and combinations thereof.

In an embodiment, the plastic may be any 3D printing plastic. In an embodiment, the plastic may be any 3D printing plastic compatible with a stereolithography (SLA) 3D printing technique, an extrusion 3D printing technique, and/or a selective laser sintering 3D printing technique.

In an embodiment, the plastic may be a polyacrylate-based commercial resin.

Exemplary Computing Device for AM-VFR Reactor

Figure 3:
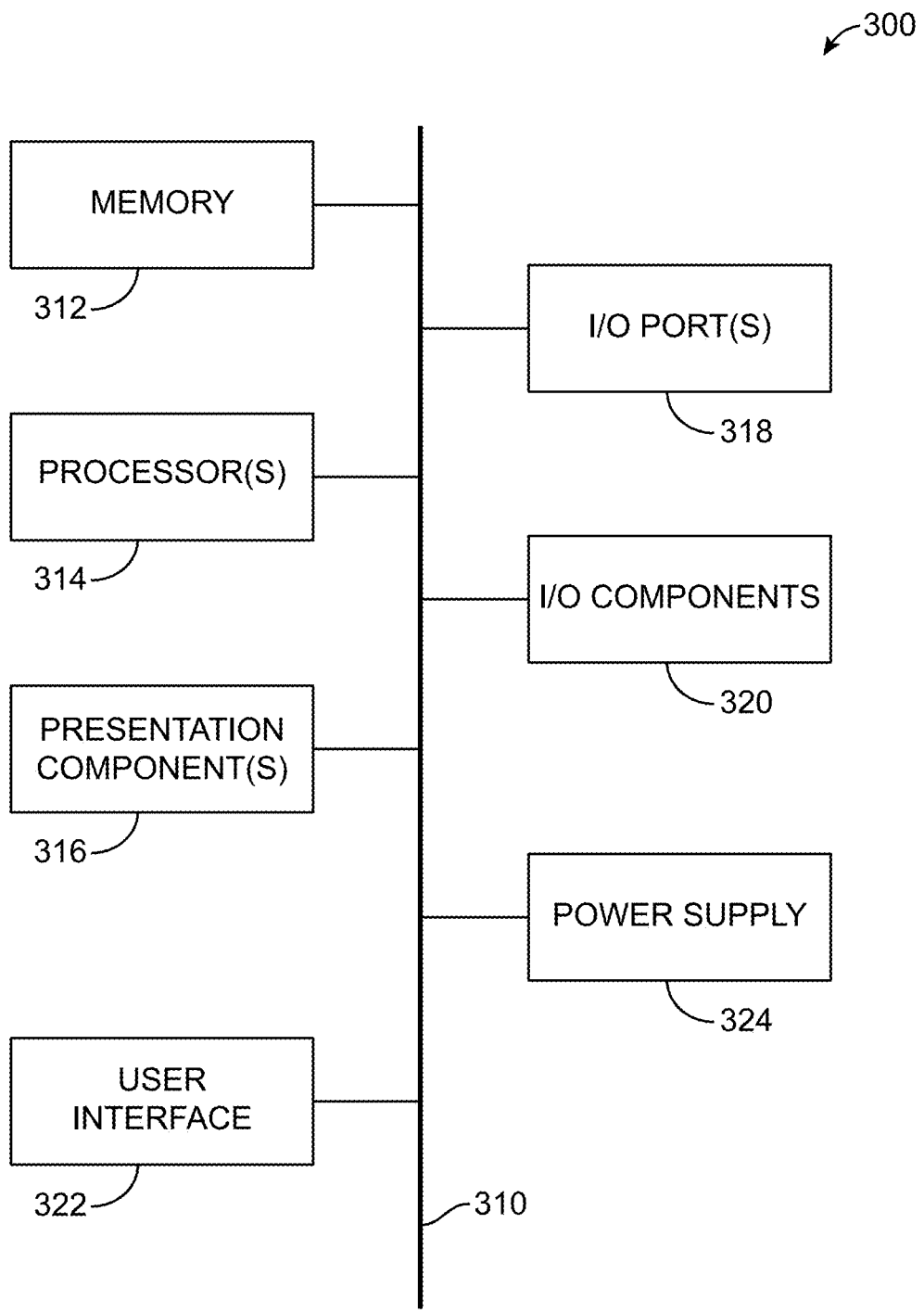
FIG. 3 illustrates a schematic of an exemplary computing device for the AM-VFR reactor according to an embodiment of the disclosure.

FIG. 3 illustrates a schematic of an exemplary computing device for the AM-VFR reactor according to an embodiment of the disclosure. Referring to the drawings in general, and initially to FIGS. 1A-1B and 2-3 in particular, an exemplary operating environment for implementing embodiments of the present disclosure is shown and designated generally as a computing device 300 for the AM-VFR reactor. The computing device 300 is but one example of a suitable computing environment and is not intended to suggest any limitation as to the scope of use or functionality of the invention. Neither should the computing device 300 be interpreted as having any dependency or requirement relating to any one or combination of components illustrated.

Embodiments of the disclosure may be described in the general context of computer code or machine-executable instructions stored as program modules or objects and executable by one or more computing devices, such as a laptop, server, mobile device, tablet, etc. Generally, program modules including routines, programs, objects, components, data structures, etc., refer to code that perform particular tasks or implement particular abstract data types. Embodiments of the disclosure may be practiced in a variety of system configurations, including handheld devices, consumer electronics, general-purpose computers, more specialty computing devices, and the like. Embodiments of the disclosure may also be practiced in distributed computing environments where tasks may be performed by remote-processing devices that may be linked through a communications network.

With continued reference to FIG. 3, the computing device 300 of the AM-VFR reactor includes a bus 310 that directly or indirectly couples the following devices: memory 312, one or more processors 314, one or more presentation components 316, one or more input/output (I/O) ports 318, I/O components 320, a user interface 322 and an illustrative power supply 324. The bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be fuzzy. For example, one may consider a presentation component such as a display device to be an I/O component. Additionally, many processors have memory. The inventors recognize that such is the nature of the art, and reiterate that the diagram of FIG. 3 is merely illustrative of an exemplary computing device that can be used in connection with one or more embodiments of the present disclosure. Further, a distinction is not made between such categories as "workstation," "server," "laptop," "mobile device," etc., as all are contemplated within the scope of FIG. 3 and reference to "computing device."

The computing device 300 of the AM-VFR reactor typically includes a variety of computer-readable media. Computer-readable media can be any available media that can be accessed by the computing device 300 and includes both volatile and nonvolatile media, removable and non-removable media. By way of example, and not limitation, computer-readable media may comprise computer-storage media and communication media. The computer-storage media includes volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 300.

The memory 312 includes computer-storage media in the form of volatile and/or nonvolatile memory. The memory 312 may be removable, non-removable, or a combination thereof. Suitable hardware devices include solid-state memory, hard drives, optical-disc drives, etc. The computing device 300 of the AM-VFR reactor includes one or more processors 314 that read data from various entities such as the memory 312 or the I/O components 320.

The presentation component(s) 316 present data indications to a user or other device. In an embodiment, the computing device 300 outputs present data indications including, but not limited to, cathodic geometric current density to a presentation component 316. Suitable presentation components 316 include a display device, speaker, printing component, vibrating component, and the like.

The user interface 322 allows the user to input/output information to/from the computing device 300. Suitable user interfaces 322 include keyboards, key pads, touch pads, graphical touch screens, and the like. For example, the user may input a type of signal profile into the computing device 300 or output, for example, a geometric current density to the presentation component 316 such as a display. In some embodiments, the user interface 322 may be combined with the presentation component 316, such as a display and a graphical touch screen. In some embodiments, the user interface 322 may be a portable hand-held device. The use of such devices is well-known in the art.

The one or more I/O ports 318 allow the computing device 300 to be logically coupled to other devices and other I/O components 320, some of which may be built in. Examples of other I/O components 320 include a printer, scanner, wireless device, and the like.

Exemplary Chemical Reactions for AM-VFR Reactor

FIG. 4A illustrates a table of exemplary chemical reactions for the AM-VFR reactor according to an embodiment of the disclosure; FIG. 4B illustrates a table of exemplary possible reactions for the AM-VFR reactor according to an embodiment of the present disclosure; and FIG. 4C illustrates a table of exemplary possible reactions for the AM-VFR reactor according to an embodiment of the present disclosure.

Any suitable chemical reaction may be used with the AM-VFR reactor. For example, a suitable chemical reaction includes but is not limited to, a $CO_2$ reduction reactions, a CO reduction reaction, a hydrogen oxidation reaction, a hydrolysis reaction, a methane oxidation reaction, an oxygen reduction reaction, and combinations and/or variations thereof.

Exemplary Flow Diagram

Figure 5:
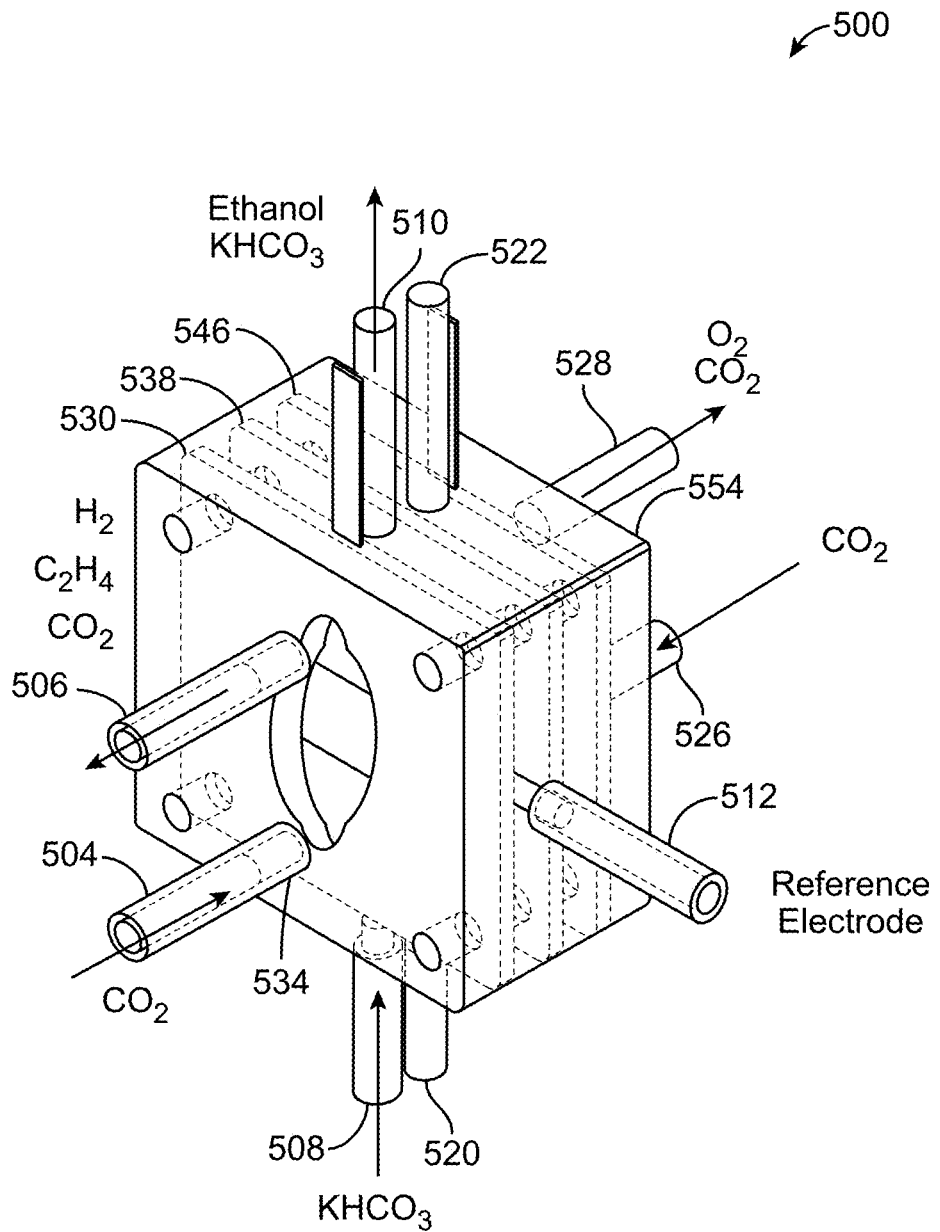
FIG. 5 illustrates an exemplary flow diagram for the AM-VFR reactor according to an embodiment of the disclosure.

FIG. 5 illustrates an exemplary flow diagram for the AM-VFR reactor according to an embodiment of the disclosure.

Cathode Gas Chamber

As shown in FIG. 5, a catholyte chamber 102, 202 comprises a cathode gas compartment 530, a cathode 534 and a catholyte compartment 538. See e.g., FIGS. 1A-1B & 2. The cathode 534 may be disposed between the cathode gas compartment 530 and the catholyte compartment 538.

In an embodiment, the cathode gas compartment 530 comprises a first inlet 504 to the catholyte chamber 102, 202 and a first outlet 506 from the catholyte chamber 102, 202. See e.g., FIGS. 1A-1B & 2.

In an embodiment, a feed is fluidly connected to the first inlet 504 to the cathodic chamber 102, 202. See e.g., FIGS. 4A-4B.

The feed may be any suitable feed compatible with the chemical reaction and the AM-VFR reactor. For example, a suitable feed includes, but is not limited to, $CH_4$, $CO_2$, CO, $H_2$, $H_2O$, $O_2$, and combinations thereof.

In an embodiment, the feed is $CH_4$. In an embodiment, the feed is $CO_2$. In an embodiment, the feed is CO. In an embodiment, the feed is $H_2$. In an embodiment, the feed is $O_2$.

The feed may have any suitable flow rate. For example, a suitable flow rate includes, but is not limited to, from about 0 sccm to about 50 sccm, and range or value there between.

In an embodiment, the flow rate may be <about 10 sccm.

In an embodiment, a cathode geometric current density may be from about 35 $mA/cm^2$ to about 500 $mA/cm^2$, and any range or value there between. In an embodiment, the cathode current density may be from about 200 $mA/cm^2$ to about 500 $mA/cm^2$.

In an embodiment, the catholyte compartment 538 comprises a second inlet 508 to the catholyte chamber 102, 202 and a second outlet 510 from the catholyte chamber 102, 202. See e.g., FIGS. 1A-1B & 2.

In an embodiment, a buffer may be fluidly connected to the second inlet 508 to the cathodic chamber 102, 202. See e.g., FIGS. 1A-1B & 2.

The buffer may be any suitable buffer compatible with the chemical reaction and the AM-VFR reactor. For example, a suitable buffer includes, but is not limited to, any $KHCO_3$ buffer.

In an embodiment, the buffer is from about 0.1 M $KHCO_3$ to about 1 M $KHCO_3$ in water, and any range or value there between. In an embodiment, the buffer is about 1 M $KHCO_3$ in water. In an embodiment, the buffer is about 0.1 M $KHCO_3$ in water.

The buffer may have any suitable flow rate. For example, a suitable flow rate includes, but is not limited to, from about 0 mL/min to about 100 mL/min, and range or value there between.

In an embodiment, the flow rate may be about 5 mL/min.

In an embodiment, the catholyte compartment 538 comprises a reference electrode 512.

Vapor-Fed Reactor

A vapor-fed reactor 114, 214 comprises a catholyte compartment 538, a membrane 142, 242 and an anolyte compartment 546. See e.g., FIGS. 1A-1B & 2. The membrane 142, 242 may be disposed between the catholyte compartment 538 and the anolyte compartment 546.

In an embodiment, the catholyte compartment 538 comprises a second inlet 508, to the catholyte chamber 102, 202 and a second outlet 510 from the catholyte chamber 102, 202. See e.g., FIGS. 1A-1B & 2.

In an embodiment, the catholyte compartment 538 comprises a reference electrode 512.

In an embodiment, the anolyte compartment 546 comprises a first inlet 116, 216 (in through membrane 142, 242) to the vapor-fed reactor 114, 214 and a first outlet 118,218 (out through membrane 142, 242) from the vapor-fed reactor 114, 214. See e.g., FIGS. 1A-1B & 2.

In an embodiment, the anolyte compartment 546 comprises a second inlet 520 to the anolyte chamber 124, 224 and a second outlet 522 from the anolyte chamber 124, 224. See e.g., FIGS. 1A-1B & 2.

In an embodiment, a buffer may be fluidly connected to the second inlet 520 to the anolyte chamber 124, 224. See e.g., FIGS. 1A-1B & 2.

The buffer may be any suitable buffer compatible with the chemical reaction and the AM-VFR reactor. For example, a suitable buffer includes, but is not limited to, any $KHCO_3$ buffer.

In an embodiment, the buffer is from about 0.1 M $KHCO_3$ to about 1 M $KHCO_3$ in water, and any range or value there between. In an embodiment, the buffer is about 1 M $KHCO_3$ in water. In an embodiment, the buffer is about 0.1 M $KHCO_3$ in water.

The buffer may have any suitable flow rate. For example, a suitable flow rate includes, but is not limited to, from about 0 mL/min to about 100 mL/min, and range or value there between.

In an embodiment, the flow rate may be about 5 mL/min.

Anolyte Chamber

An anolyte chamber 124, 224 comprises an anolyte compartment 546, an anode 150, 250 and an anode gas compartment 554. See e.g., FIGS. 1A-1B & 2. The anode 150, 250 may be disposed between the anolyte compartment 546 and the anode gas compartment 554.

In an embodiment, the anolyte compartment 546 comprises a second inlet 520 to the anolyte chamber 124, 224 and a second outlet 522 from the anolyte chamber 124, 224. See e.g., FIGS. 1A-1B & 2.

In an embodiment, a buffer may be fluidly connected to the second inlet 520 to the anolyte chamber 124, 224. See e.g., FIGS. 1A-1B & 2.

The buffer may be any suitable buffer compatible with the chemical reaction and the AM-VFR reactor. For example, a suitable buffer includes, but is not limited to, any $KHCO_3$ buffer.

In an embodiment, the buffer is from about 0.1 M $KHCO_3$ to about 1 M $KHCO_3$ in water, and any range or value there between. In an embodiment, the buffer is about 1 M $KHCO_3$ in water. In an embodiment, the buffer is about 0.1 M $KHCO_3$ in water.

In an embodiment, the anode gas compartment 554 comprises a first inlet 526 to the anolyte chamber 124, 224 and a first outlet 528 from the anolyte chamber 124, 224. See e.g., FIGS. 1A-1B & 2.

In an embodiment, a feed may be fluidly connected to the first inlet 526 of the anolyte chamber 124, 224. See e.g., FIGS. 1A-1B & 2.

The feed may be any suitable feed compatible with the chemical reaction and the AM-VFR reactor. For example, a suitable feed includes, but is not limited to, $CH_4$, $CO_2$, CO, $H_2$, $H_2O$ and $O_2$.

In an embodiment, the feed is $CH_4$. In an embodiment, the feed is $CO_2$. In an embodiment, the feed is CO. In an embodiment, the feed is $H_2$. In an embodiment, the feed is $O_2$.

The feed may have any suitable flow rate. For example, a suitable flow rate includes, but is not limited to, from about 0 sccm to about 50 sccm, and range or value there between.

In an embodiment, the flow rate may be <about 10 sccm.

Prototype AM-VFR Reactor Testing

Figure 6:
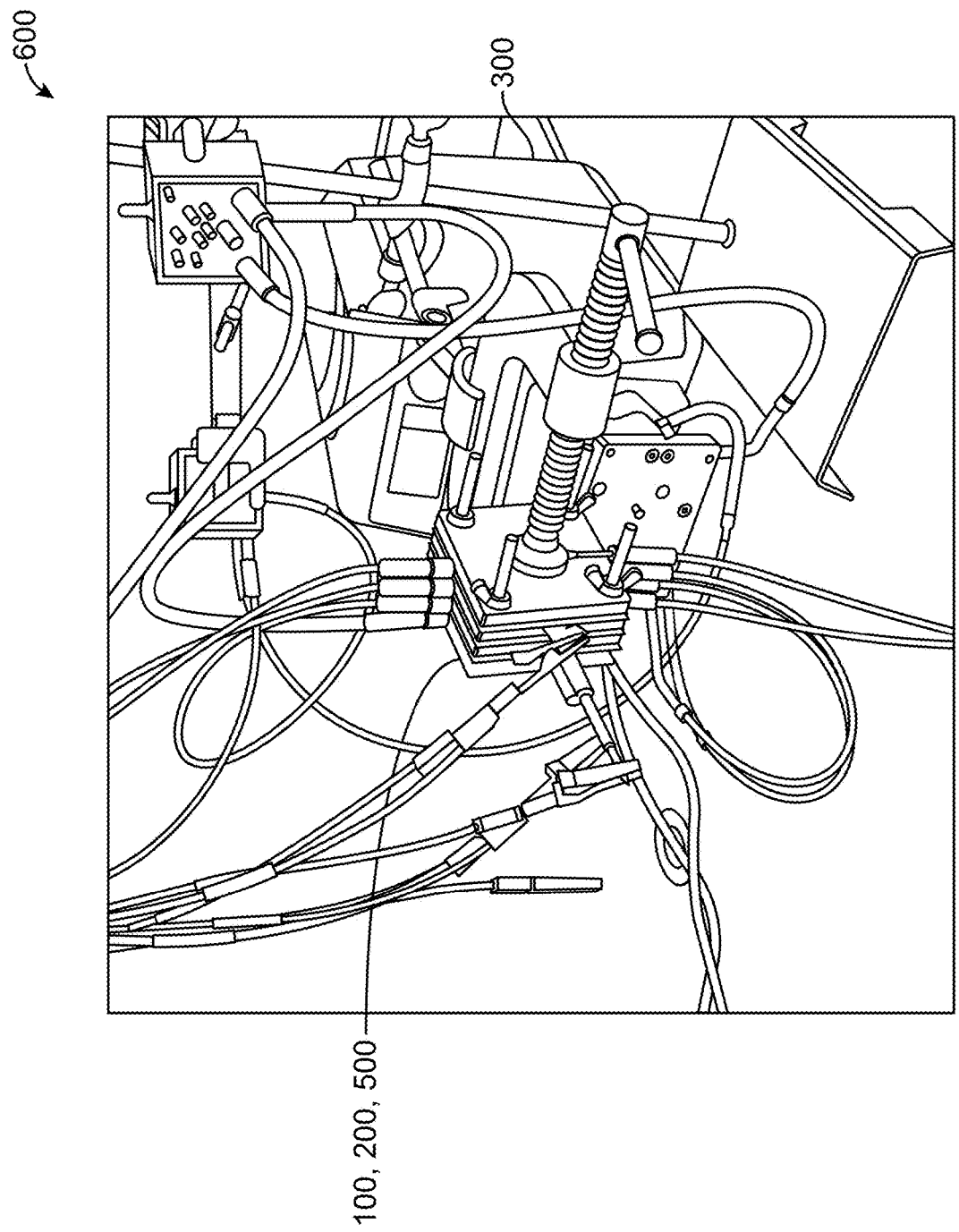
FIG. 6 illustrates a photograph of a prototype AM-VFR reactor according to an embodiment of the disclosure.

FIG. 6 illustrates a photograph of a prototype AM-VFR reactor 600 according to an embodiment of the disclosure.

As shown in FIG. 6, the prototype AM-VFR reactor 600 comprises a cathode gas compartment 130, 230, a catholyte compartment 138, 238, an anolyte compartment 146, 246, and an anode gas compartment 154, 254. See e.g., FIGS. 1A-1B & 2.

The cathode gas compartment 130, 230, the catholyte compartment 138, 238, the anolyte compartment 146, 246, and the anode gas compartment 154, 254 were made of a polyacrylate-based commercial resin.

The cathode gas compartment 130, 230, the catholyte compartment 138, 238, the anolyte compartment 146, 246, and the anode gas compartment 154, 254 were printed of using a stereolithography (SLA) 3D printing technique with a polyacrylate-based commercial resin. See e.g., FIG. 13A.

The cathode gas compartment 130, 230 had a centrally located window 105, 205 for the cathode 134, 234 with a geometric surface area of about 1 $cm^2$.

The catholyte compartment 138, 238 had a centrally located window 135, 235 for the cathode 134, 234 with a geometric surface area of about 1 $cm^2$.

The catholyte compartment 138, 238 had a centrally located window 135, 235 for the membrane 142, 242 with a geometric surface area of about 1 $cm^2$.

The anolyte compartment 146, 246 had a centrally located window 145, 245 for the membrane 142, 242 with a geometric surface area of about 1 $cm^2$.

The anolyte compartment 146, 246 had a centrally located window 145, 245 for the anode 150, 250 with a geometric surface area of about 1 $cm^2$.

The anode gas compartment 154, 254 had a centrally located window 125, 225 for the anode 150, 250 with a geometric surface area of about 1 $cm^2$.

Metrics for AM-VFR Prototype Reactor

Figure 7:
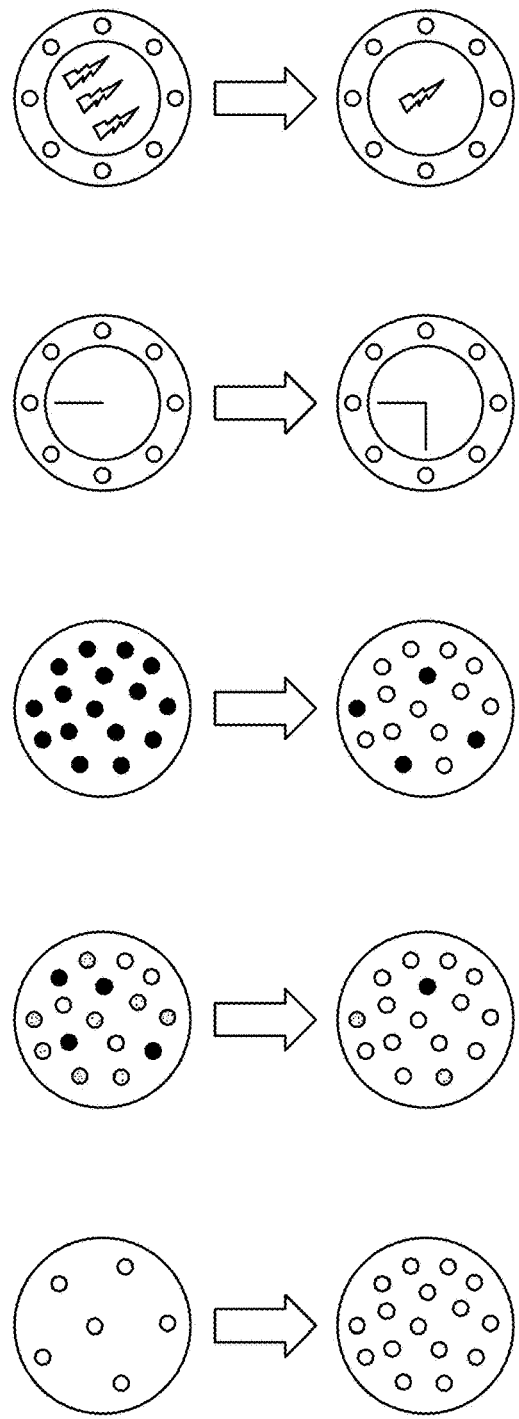
FIG. 7 illustrates a table of metrics for the prototype AM-VFR reactor according, showing >about 50% energy efficiency.

FIG. 7 illustrates a table of metrics for the prototype AM-VFR reactor according, showing >50% energy efficiency.

Testing of Prototype AM-VFR Reactor

Measurements of product selectivity towards 0-carbon ($H_2$), 1-carbon (CO, HCOO—, $CH_4$), 2-carbon ($C_2H_4$, $C_2H_5OH$, $CH_3COO^-$, $CH_3CHO$), and 3-carbon ($C_3H_7OH$) products and partial current densities for the prototype AM-VFR with an electrolyte flow rate of 5 mL/min and a $CO_2$ injection flow rate of 10 sccm. Eight (8) different cathodic geometric current densities, ranging from about −35 mA/$cm^2$ to about −500 mA/$cm^2$, were tested.

Figure 8A:
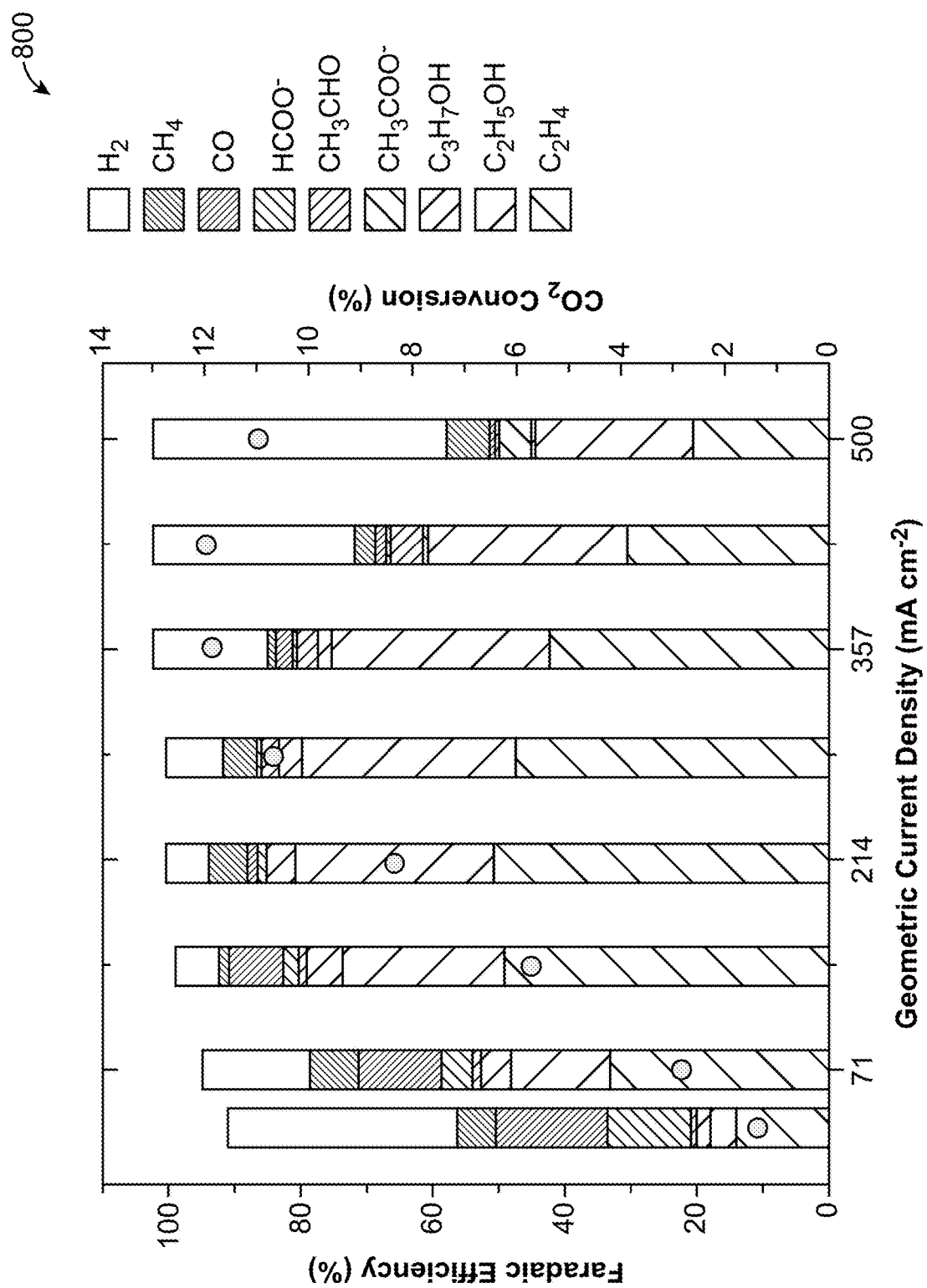
FIG. 8A illustrates a graph of Geometric Current Density ($mA/cm^2$) vs. Faradaic Efficiency (%) and Geometric Current Density ($mA/cm^2$) vs. $CO_2$ Conversion (%) for the prototype AM-VFR reactor.

FIG. 8A illustrates a graph of Geometric Current Density (mA/$cm^2$) vs. Faradaic Efficiency (%) and Geometric Current Density (mA/$cm^2$) vs. $CO_2$ Conversion (%) for the prototype AM-VFR reactor, showing Faradaic efficiencies of products ($H_2$, $CH_4$, CO, $C_2H_4$, HCOO—, $CH_3CHO$, $CH_3COO$—, $C_3H_7OH$, $C_2H_5OH$, $C_2H_4$) formed in the prototype AM-VFR reactor with a Cu-PTFE cathode as a function of cathode geometric current density.

Figure 8B:
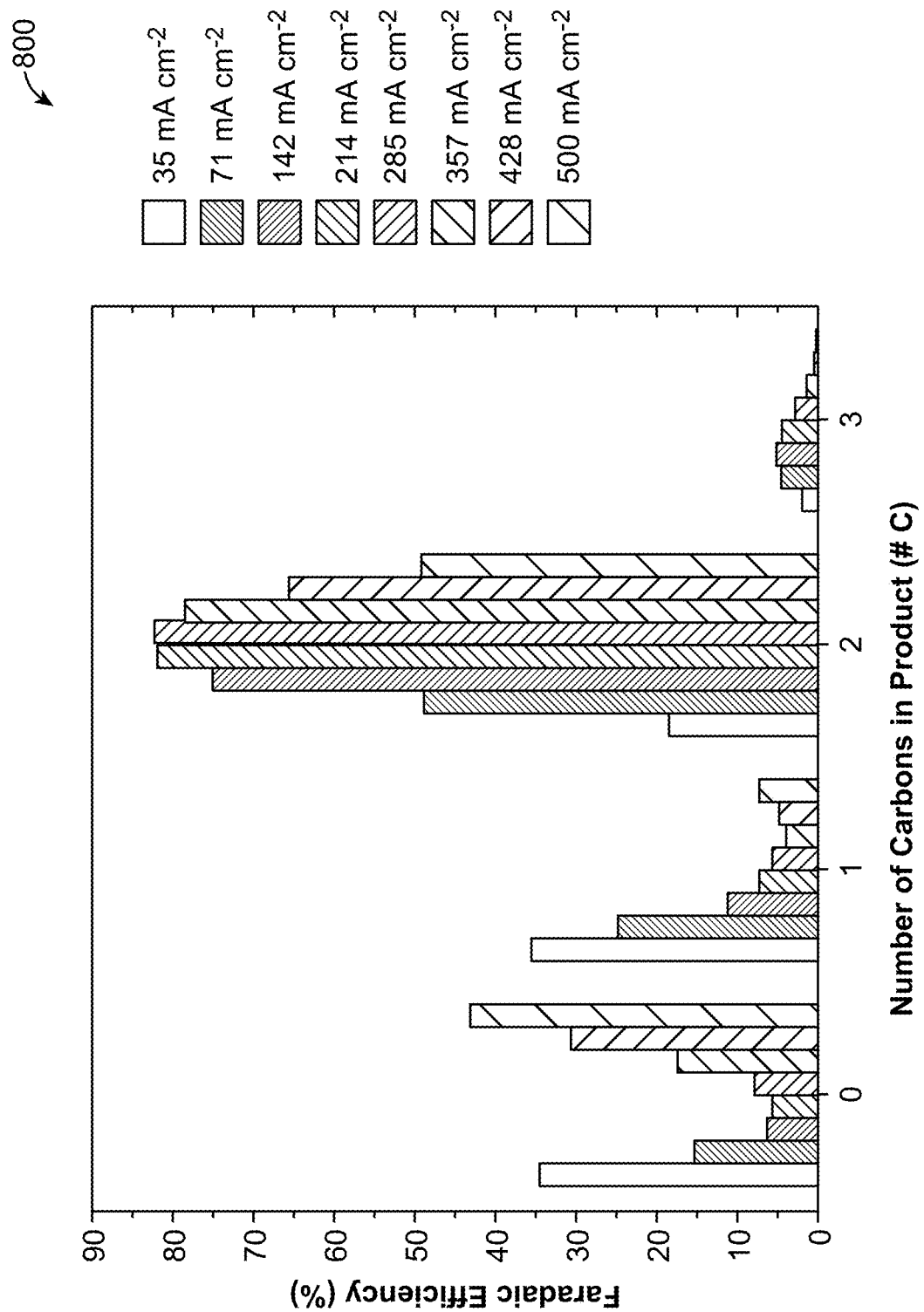
FIG. 8B illustrates a graph of Number of Carbons in Product (#C) vs. Faradaic Efficiency (%) for the prototype AM-VFR reactor.

FIG. 8B illustrates a graph of Number of Carbons in Product (#C) vs. Faradaic Efficiency (%) for the prototype AM-VFR reactor, showing Faradaic efficiencies of 0-carbon ($H_2$), 1-carbon (CO, $HCOO^-$, $CH_4$), 2-carbon ($C_2H_4$, $C_2H_5OH$, $CH_3COO^-$, $CH_3CHO$), and 3-carbon ($C_3H_7OH$) products formed in the prototype AM-VFR reactor with a Cu-PTFE cathode at different cathode geometric current densities (35 mA/cm², 71 mA/cm², 142 mA/cm², 214 mA/cm², 285 mA/cm², 357 mA/cm², 428 mA/cm², 500 mA/cm²).

Figure 8C:
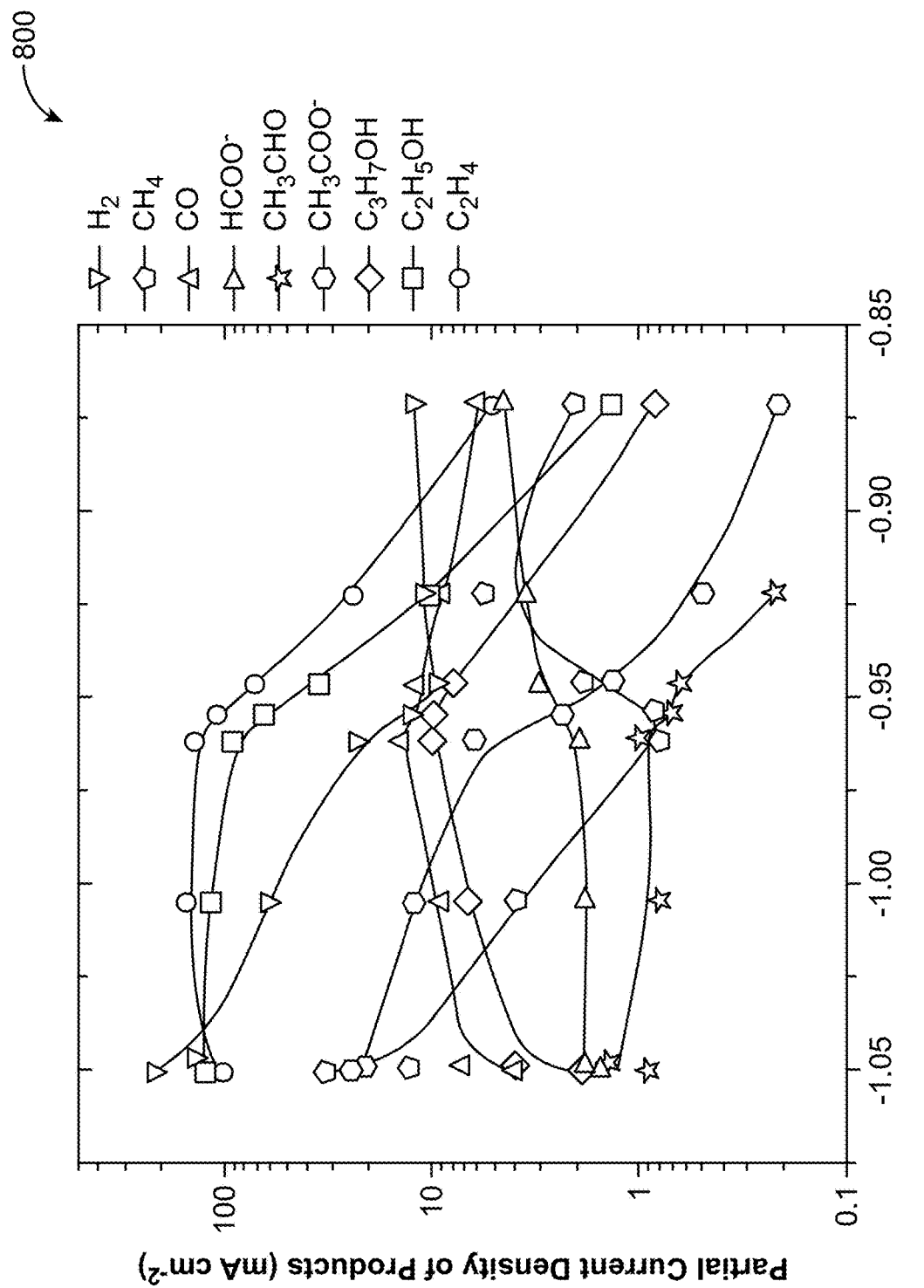
FIG. 8C illustrates a graph of "Working Electrode Potential ($E_{WE}$) vs Reversible Hydrogen Electrode (RHE) (V)" vs Partial Current Density of Products ($mA/cm^2$) for the prototype AM-VFR reactor.

FIG. 8C illustrates a graph of "Working Electrode Potential ($E_{WE}$) vs Reversible Hydrogen Electrode (RHE) (V)" vs Partial Current Density of Products (mA/cm²) for the prototype AM-VFR reactor, showing partial current densities of 0-carbon ($H_2$), 1-carbon (CO, $HCOO^-$, $CH_4$), 2-carbon ($C_2H_4$, $C_2H_5OH$, $CH_3COO^-$, $CH_3CHO$), and 3-carbon ($C_3H_7OH$) products formed in the prototype AM-VFR reactor with a Cu-PTFE cathode as a function potential.

Figure 8D:
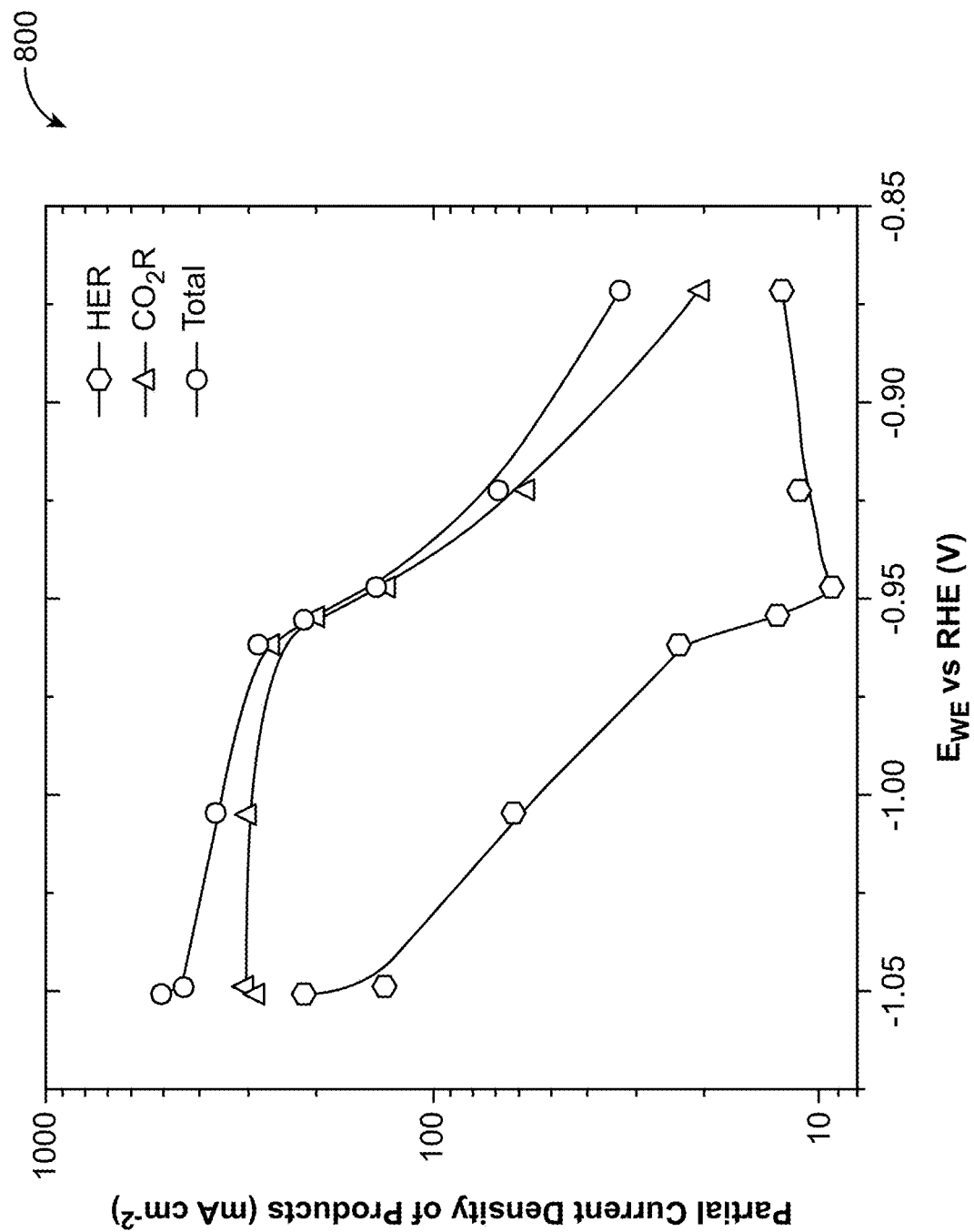
FIG. 8D illustrates a graph of "Working Electrode Potential ($E_{WE}$) vs Reversible Hydrogen Electrode (RHE) (V)" vs "Partial Current Density of Products ($mA/cm^2$) for the prototype AM-VFR reactor.

FIG. 8D illustrates a graph of "$E_{WE}$ vs RHE (V)" vs "Partial Current Density of Products (mA/cm²) for the prototype AM-VFR reactor, showing partial current densities formed towards $CO_2R$ and hydrogen evolution reaction (HER) in the prototype AM-VFR reactor with a Cu-PTFE cathode as a function of potential.

As shown in FIG. 8A, the prototype AM-VFR reactor demonstrated remarkable selectivity for $CO_2R$ at various cathode geometric current densities in neutral electrolytes. For example, over 90% Faradaic efficiency for $CO_2R$ was achieved from about 142 mA/cm² to about 285 mA/cm², and a maximum of about 94% Faradaic efficiency was reached at about. Further, $CO_2$ conversion increases linearly until about 285 mA/cm² and, then, parabolically reaches maximum value of about 12% single-pass $CO_2$ conversion at about 428 mA/cm². These results show that high selectivity for $CO_2R$ and $CO_2$ conversion can be achieved in bulk pH-neutral environments with little to no modifications or additives to either the electrocatalyst or electrolyte.

Total $C_{2+}$ selectivity reaches a maximum of >about 86% Faradaic efficiency at about 285 mA/cm², which is one of the highest selectivities to multi-carbon products achieved for $CO_2R$, particularly for pH-neutral electrolytes. Selectivity towards ethylene and ethanol, the primary multi-carbon products formed, reach maximums of about 49.8% and about 32.8% at about 214 mA/cm² and about 357 mA/cm², respectively. Other multi-carbon products, such as n-propanol and acetic acid, are also produced at lower Faradaic efficiencies, reaching maximum values of about 5.6% and about 5.1% at about 142 mA/cm² and about –500 mA/cm², respectively. Comparatively, low quantities of single-carbon products are observed across a wide range of current densities. Carbon monoxide (CO) and formate ($HCOO^-$), both 2-electron $CO_2R$ products, steadily decrease as the current becomes increasingly cathodic. CO drops from about 16.6% at about 35 mA/cm² to about 0.8% at about 500 mA/cm², while $HCOO^-$ decreases from about 12.9% at about 35 mA/cm² to about 0.3% at about 500 mA/cm². The selectivity towards methane ($CH_4$) appears to be parabolic compared to the other $CO_2R$ products (i.e., minimum Faradaic efficiency of about 0.4% at about 285 mA/cm²).

To further understand the selectivity for the prototype AM-VFR, the specific trends of product Faradaic efficiency are shown in FIG. 8B. Hydrogen, the only zero-carbon product produced at the cathode, decreases in Faradaic efficiency from about 35% to about 6% between about 35 mA/cm² and about 142 mA/cm² (see FIG. 8B), remaining below about 9% from about 142 to about 285 mA/cm². This indicates that $CO_2R$ may be preferred compared to HER in this system within this current density range. Comparatively, the total selectivity for $C_2$ products rapidly increases from about 35 mA/cm² to about 285 mA/cm², reaching a maximum of about 82.2% Faradaic efficiency. As a result, $C_1$ product selectivity is low in this regime, but raises at higher current densities due to increased methane production. This inverse relationship may result from several factors, such as sufficient concentration of $CO_2^*$ and $CO^*$ on the electrocatalyst surface, favorable kinetics for carbon-carbon coupling, and potential pH effects.

As shown in in FIG. 8C, when analyzing the partial current density of products on a potential scale, two distinct regimes are identified based on electric potential. The first regime, between about –0.87 V and about –1.0 V vs RHE (corresponding to current densities of about 35 mA/cm² to about 285 mA/cm²), $CO_2R$ partial current density increases linearly as a function of potential (see FIG. 8D). This indicates that a sufficient quantity $CO_2$ is being supplied to the electrocatalyst surface. Further, this suggests that the performance of the electrocatalyst in this region may be kinetically limited, adhering to the behavior of Butler-Volmer kinetics. In addition, the partial current densities of the 2-carbon ($C_2H_4$, $C_2H_5OH$, $CH_3COO^-$, $CH_3CHO$) products correlate with each other, with an increasing oxygenate-to-hydrocarbon ratio at more negative applied potentials. Further, the slopes of the partial current densities for most of the $C_2$ products (e.g., $C_2H_4$, $C_2H_5OH$, and $CH_3COO^-$) appear to be similar (e.g., 48 mV/dec to 72 mV/dec), indicating that these $C_2$ products may share similar reaction pathways and intermediates.

The second region is more cathodic than –1.0 V vs RHE in FIG. 8D. In the second region, a transition from a linear to an asymptotic $CO_2R$ current density occurs around about 307 mA/cm². This suggests that the performance in this regime is likely a convolution of inhibiting mass transport and kinetic effects. Further, this understanding of the performance is supported by an increasing HER and a changing $CO_2R$ product distribution within this regime, as shown in FIG. 8C. While ethylene and ethanol partial current densities flatten, $CH_4$ partial current density increases with a similar slope to that of $H_2$. This relationship between $CH_4$ and $H_2$ suggests a higher adsorbed hydrogen ($H^*$) coverage on the electrocatalyst surface, leading to a greater probability of protonating adsorbed single-carbon species. Interestingly, while the other multi-carbon products reach a constant partial current density, acetate production continues to increase throughout both regimes. This suggests acetate formation is correlated with concentration of $OH^-$. Further, in the case of acetate production via solution-based reactions, a positive correlation with over potential is observed.

As the total current density approaches about 500 mA/cm², most of the additional current contributes to HER, as water reduction is the only other reaction available in the absence of $CO_2$ at the surface. Further, at sufficiently high current densities, total $CO_2$ conversion decreases, suggesting a modified reaction environment that favors of hydrogen evolution. This may be due to a number of factors, such as a sufficiently high applied potential, a dominant proton-donor shift, or nucleation of gas bubbles, blocking $CO_2$ active sites or inhibiting mass transport.

Figure 9:
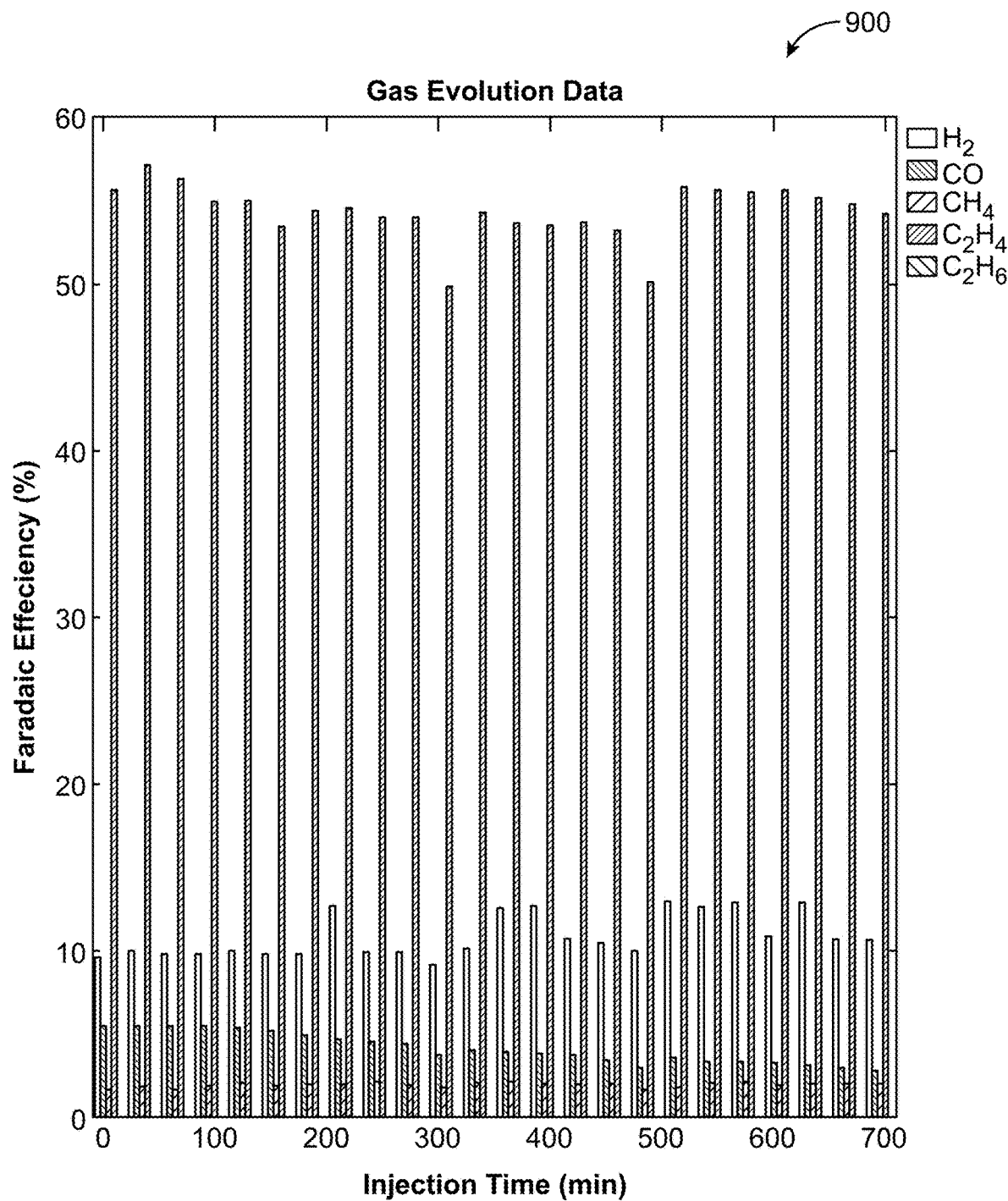
FIG. 9 illustrates a graph of Injection Time (minutes) vs. Faraday Efficiency (%) for the prototype AM-VFR reactor.

FIG. 9 illustrates a graph of Injection Time (minutes) vs. Faraday Efficiency (%) for the prototype AM-VFR reactor, showing Faradaic efficiencies for gaseous products ($H_2$, CO, $CH_4$, $C_2H_4$) formed in the prototype AM-VFR reactor with a Cu-PTFE cathode at a current density of about 142 mA/cm² as a function of time.

Production of $C_2H_4$ was demonstrated to be constant (with a selectivity of ~55%) over the 19 hours of continuous operation.

Mass Transfer Limitations

Figure 10:
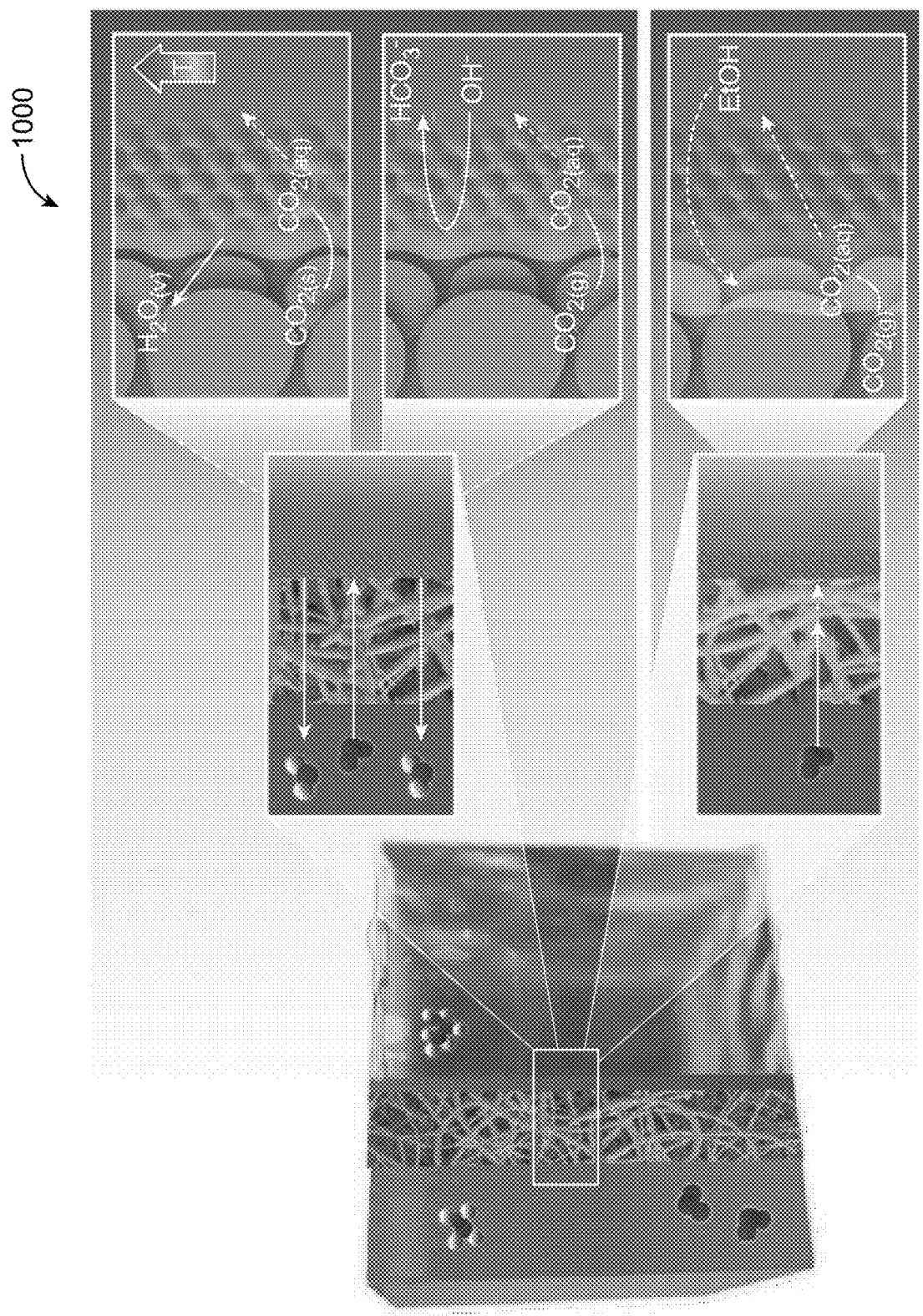
FIG. 10 illustrates a cross-sectional view of a membrane in the prototype AM-VFR reactor, showing mass transfer limitations.

FIG. 10 illustrates a cross-sectional view of a Cu-PTFE cathode in an AM-VFR reactor, showing mass transfer mass transfer limitations.

As shown in the upper, right detailed view of FIG. 10, resistive heating causes dynamic changes in temperature (i.e., increasing temperature), reducing solubility of $CO_2$.

As shown in the middle right detailed view of FIG. 10, OH— formed from the reaction reacts with $CO_2$, forming bicarbonate.

As shown in the lower, right detailed view of FIG. 10, ethanol generated at the electrocatalyst changes the wettability of the PTFE support, leading to partial flooding.

Unexpected Results with AM-VFR Reactor

The performance of the prototype AM-VFR reactor was compared to the performance of prior VFR reactors for two chemical reactions (e.g., ethanol, ethylene), as follows:

$$2CO_2 + 3H_2O \rightarrow C_2H_5OH + 3O_2$$

$$CO_2 + 2H_2O \rightarrow C_2H_2 + (5/2)O_2$$

Figure 11A:
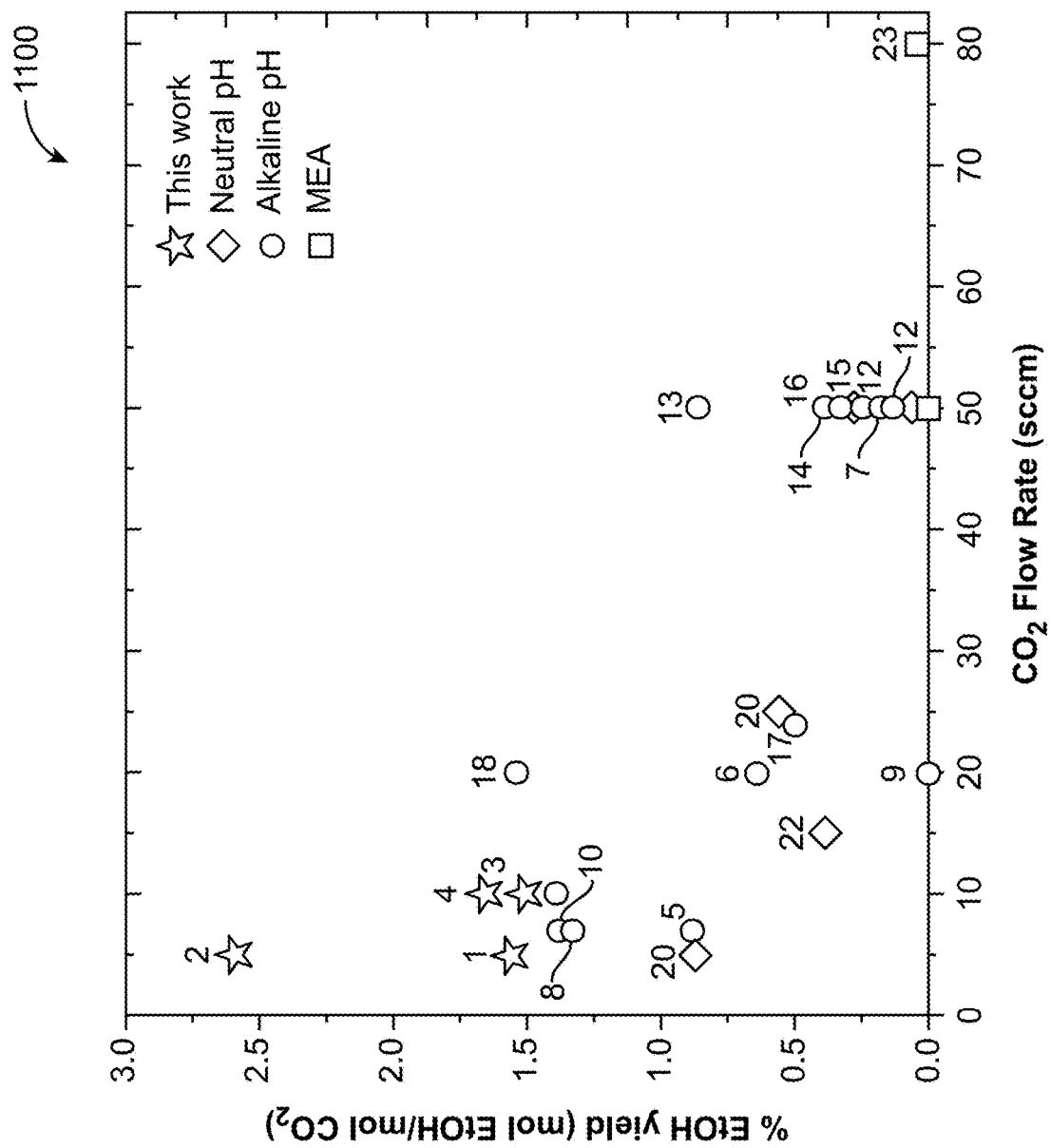
FIG. 11A illustrates a graph of $CO_2$ Flow Rate (sccm) vs. %EtOH yield (mol EtOH/mol $CO_2$), showing higher yields with AM-VFR reactor at low $CO_2$ flow rates.
Figure 11B:
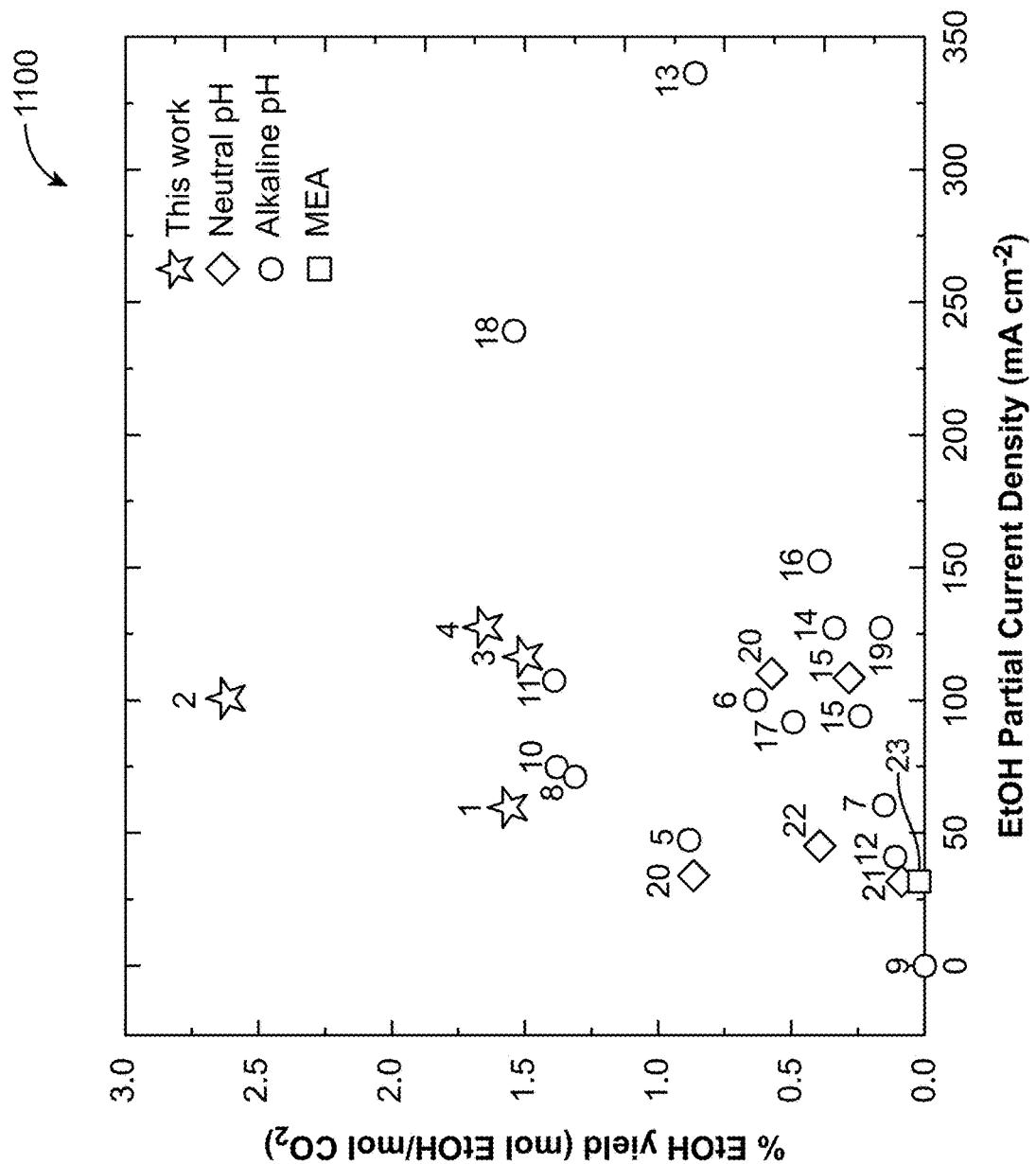
FIG. 11B illustrates a graph of EtOH Partial Current Density ($mA/cm^2$) vs. %EtOH yield (mol EtOH/mol $CO_2$)

FIG. 11A illustrates a graph of $CO_2$ Flow Rate (sccm) vs. %EtOH yield (mol EtOH/mol $CO_2$), showing higher ethanol yields with AM-VFR Reactor at low $CO_2$ flow rates; and FIG. 11B illustrates a graph of EtOH Partial Current Density (mA/cm$^2$) vs. %EtOH yield (mol EtOH/mol $CO_2$).

In FIGS. 11a and 11B, yield is defined as follows:

$$\text{Yield} = \frac{\text{products out}}{\text{reactants in}} = \frac{\text{mol } C_2H_5OH \text{ produced}}{\text{mol } CO_2 \text{ in}}$$

As shown in FIGS. 11A and 11B, the AM-VFR Reactor produces higher yields of ethanol than previous VFR reactors (e.g., neutral pH, alkaline pH, MEA), particularly at lower $CO_2$ flow rates (e.g., <about 15 sccm).

Figure 12A:
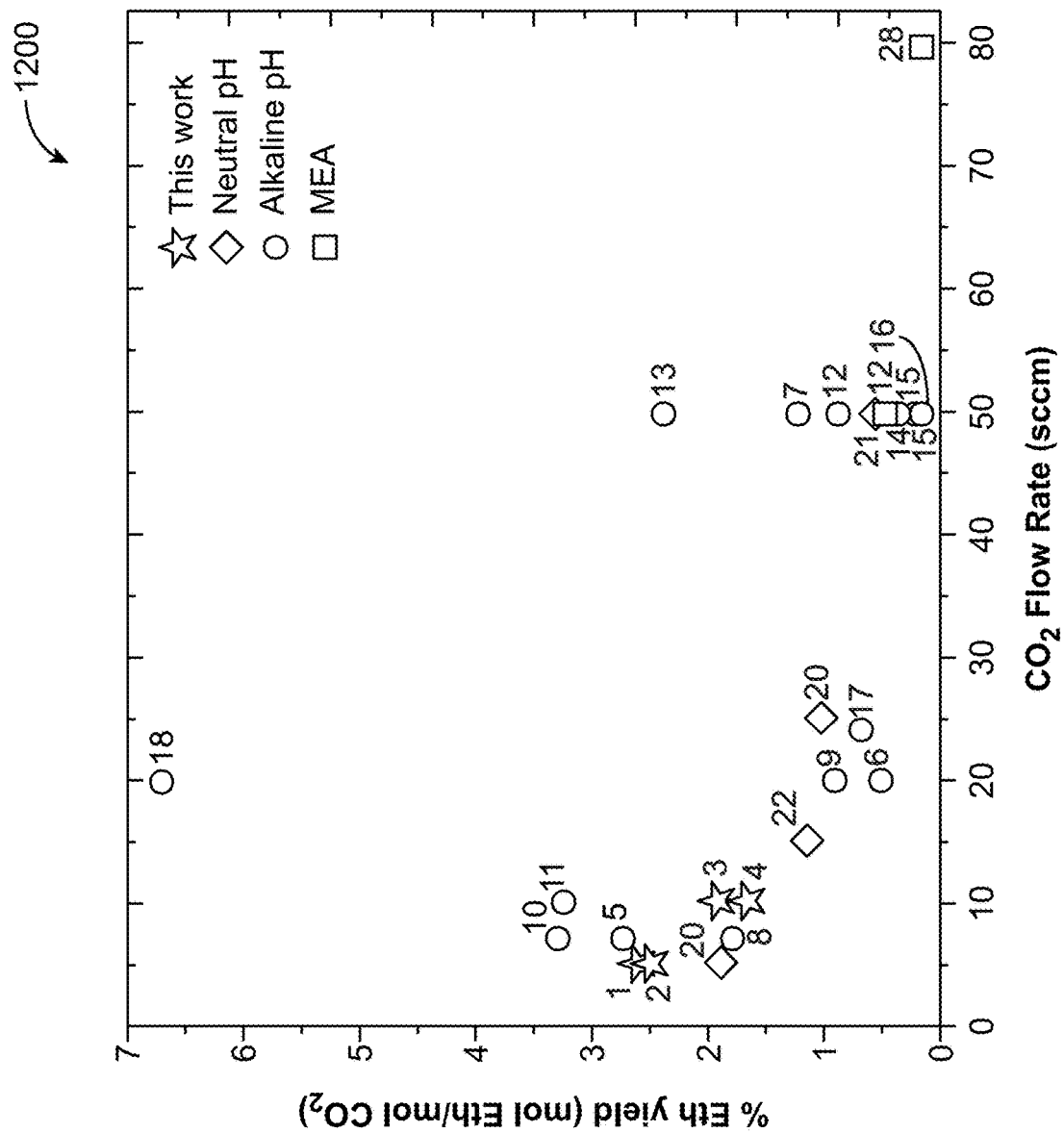
FIG. 12A illustrates a graph of $CO_2$ Flow Rate (sccm) vs. %Ethylene yield (mol Eth/mol $CO_2$), showing higher yields with AM-VFR reactor at low $CO_2$ flow rates.
Figure 12B:
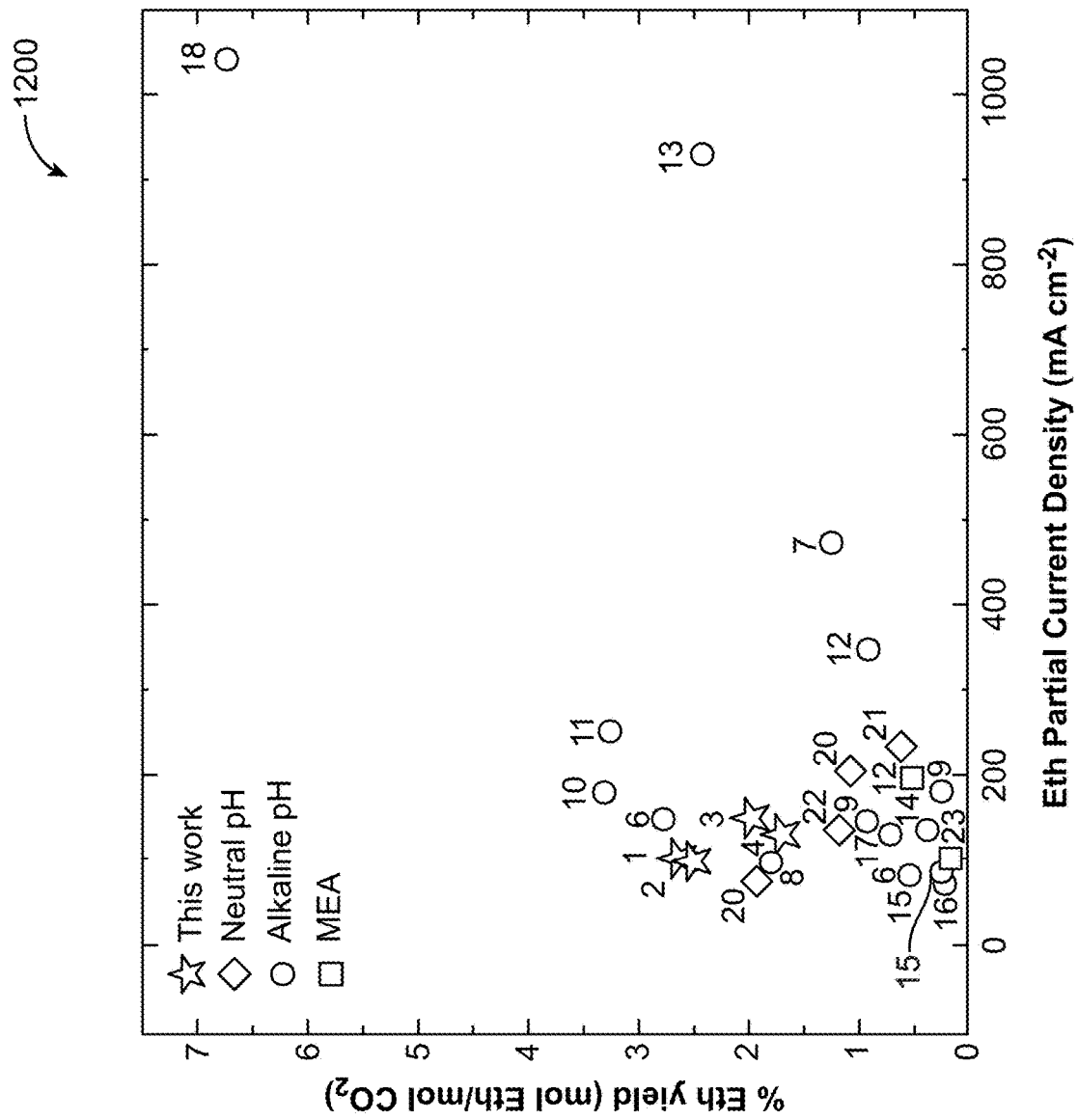
FIG. 12B illustrates a graph of Eth Partial Current Density (mA/cm2) vs. Eth yield (mol Eth/mol $CO_2$)

FIG. 12A illustrates a graph of $CO_2$ Flow Rate (sccm) vs. %Ethylene yield (mol Eth/mol $CO_2$), showing higher ethylene yields with AM-VFR reactor at low $CO_2$ flow rates; and FIG. 12B illustrates a graph of Eth Partial Current Density (mA/cm$_2$) vs. Eth yield (mol Eth/mol $CO_2$).

In FIGS. 12A and 12B, yield is defined as follows:

$$\text{Yield} = \frac{\text{products out}}{\text{reactants in}} = \frac{\text{mol } C_2H_4 \text{ produced}}{\text{mol } CO_2 \text{ in}}$$

As shown in FIGS. 12A and 12B, the AM-VFR reactor produces higher yields of ethylene than previous VFR reactors (e.g., neutral pH, alkaline pH, MEA), particularly at lower $CO_2$ flow rates (e.g., <about 5 sccm).

The reference numbers in FIGS. 11A-11B and 12A-12B correspond to the present disclosure, as follows:

1. The present disclosure at a cathode geometric current density of about 214 mA/cm$^2$ and a $CO_2$ flow rate of about 5 sccm.

2. The present disclosure at a cathode geometric current density of about 357 mA/cm$^2$ and a $CO_2$ flow rate of about 10 sccm.

3. The present disclosure at a cathode geometric current density of about 357 mA/cm$^2$ and a $CO_2$ flow rate of about 10 sccm.

4. The present disclosure at a cathode geometric current density of about 428 mA/cm$^2$ and a $CO_2$ flow rate of about 10 sccm.

Exemplary 3D Printing and Advanced Manufacturing Techniques

Figure 13A:
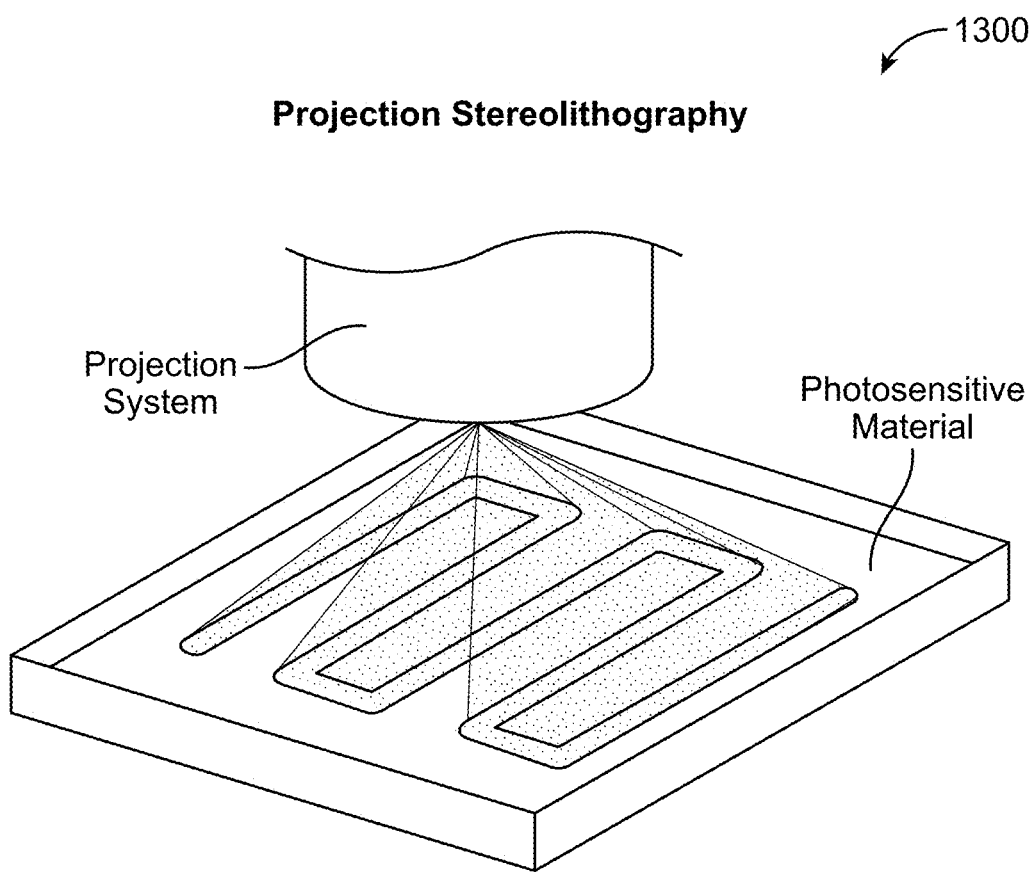
FIG. 13A illustrates a right, front perspective view of an exemplary projection stereolithography system.
Figure 13B:
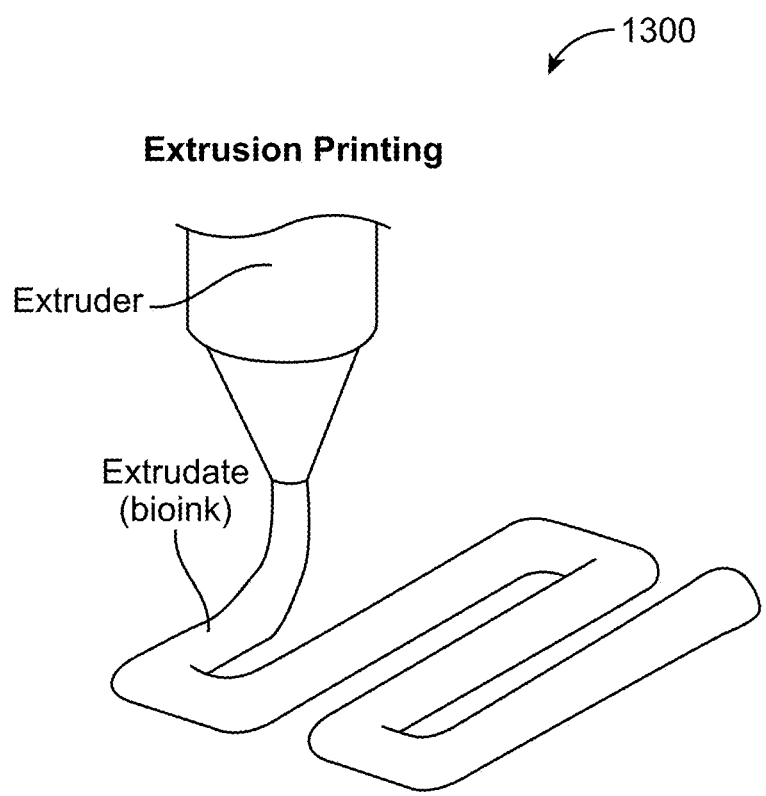
FIG. 13B illustrates a right, front perspective view of an exemplary extrusion printing system.
Figure 13C:
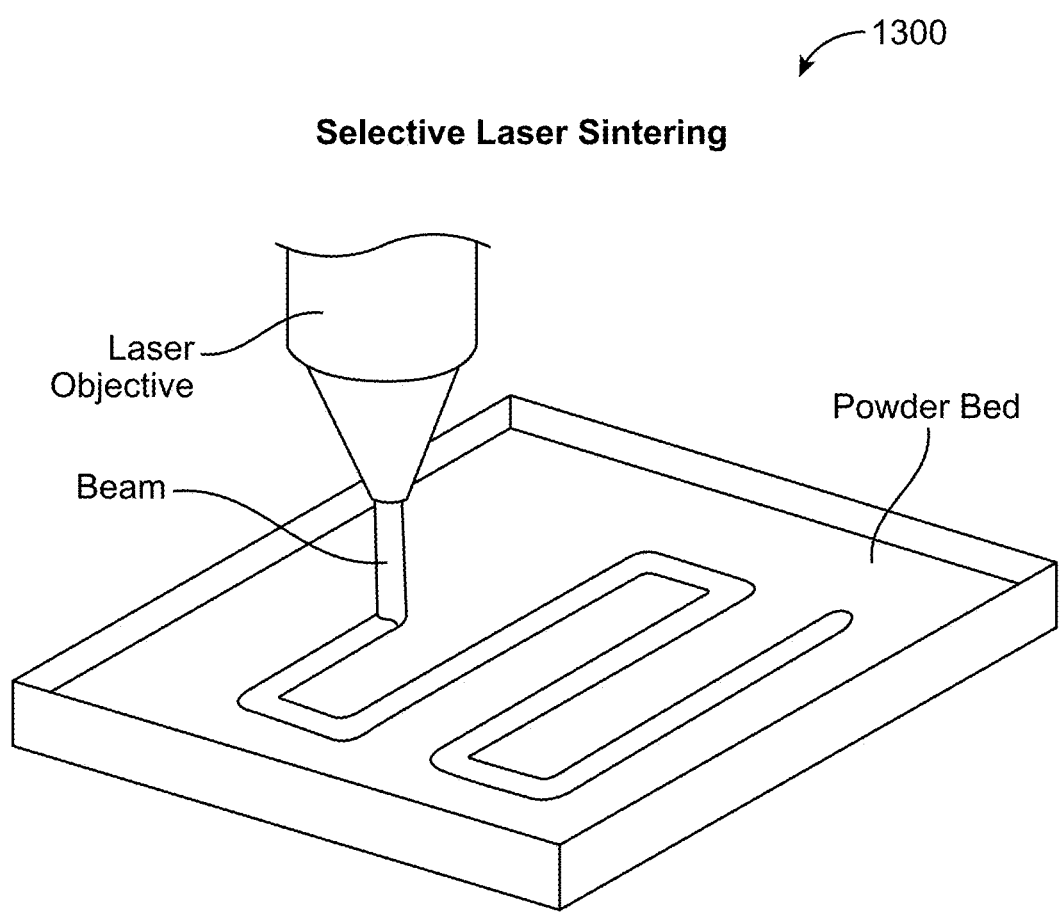
FIG. 13C illustrates a right, front perspective view of an exemplary selective laser sintering system.

FIG. 13A illustrates a right, front perspective view of an exemplary stereolithography projection system; FIG. 13B illustrates a right, front perspective view of an exemplary extrusion printing system; and FIG. 13C illustrates a right, front perspective view of an exemplary selective laser sintering system.

As shown in FIG. 13A, a stereolithography (SLA) 3D printing technique uses a projection stereolithography system 1302 having a projection system 1304 to print a photosensitive material 1306.

In an embodiment, the SLA 3D printing technique may be used to print one or more of the cathode gas compartment 130, 230, the catholyte compartment 138, 238, the anolyte compartment 146, 246 and the anode gas compartment 154, 254 of the AM-VFR reactor 100, 200.

As shown in FIG. 13B, an extrusion 3D printing technique uses an extrusion printing system 1312 having an extruder 1314 to print an extrudate (e.g., bioink) 1316.

In an embodiment, the extrusion 3D printing technique may be used to print one or more of the cathode gas compartment 130, 230, the catholyte compartment 138, 238, the anolyte compartment 146, 246 and the anode gas compartment 154, 254 of the AM-VFR reactor 100, 200.

As shown in FIG. 13C, a selective laser sintering 3D printing technique uses a selective laser sintering system 1322 having a laser objective 1324 and a laser beam 1324a to print a powder bed 1326.

In an embodiment, the selective laser sintering 3D printing technique may be used to print one or more of the cathode gas compartment 130, 230, the catholyte compartment 138, 238, the anolyte compartment 146, 246 and the anode gas compartment 154, 254 of the AM-VFR reactor 100, 200.

Method of Making AM-VFR Reactor

Figure 14:
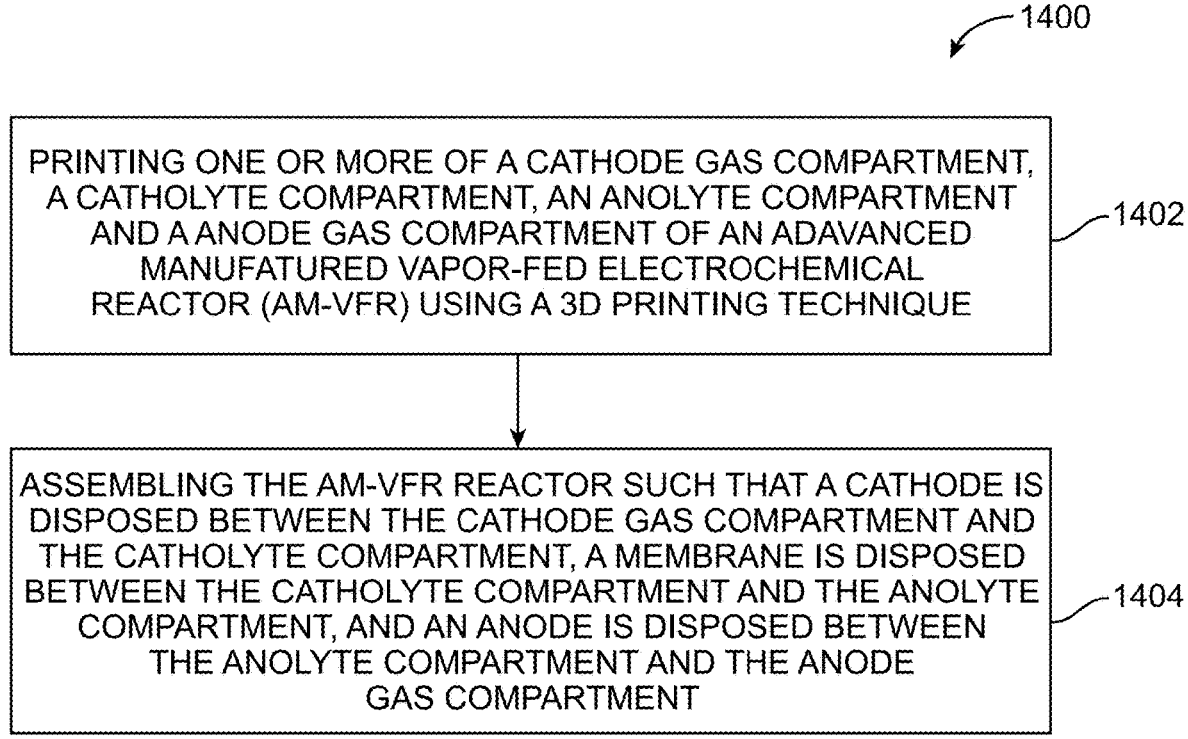
FIG. 14 illustrates a flow chart of a method of making an advanced manufactured vapor-fed electrochemical reactor (AM-VFR) according to an embodiment of the disclosure.

FIG. 14 illustrates a flow chart of a method of making an advanced manufactured vapor-fed electrochemical reactor (AM-VFR) according to an embodiment of the disclosure.

As shown in FIG. 14, the method of making the AM-VFR reactor includes a) printing one or more of a cathode gas compartment, a catholyte compartment, an anolyte compartment and a anode gas compartment of the AM-VFR reactor using a 3D printing technique 1402; and assembling the AM-VFR reactor such that a cathode is disposed between the cathode gas compartment and the catholyte compartment, a membrane is disposed between the catholyte compartment and the anolyte compartment, and an anode is disposed between the anolyte compartment and the anode gas compartment 1404.

In an embodiment, the 3D printing technique is a stereolithography (SLA) 3D printing technique, an extrusion 3D printing technique, a selective laser sintering 3D printing technique, and combinations thereof.

Method of Using AM-VFR Reactor

Figure 15:
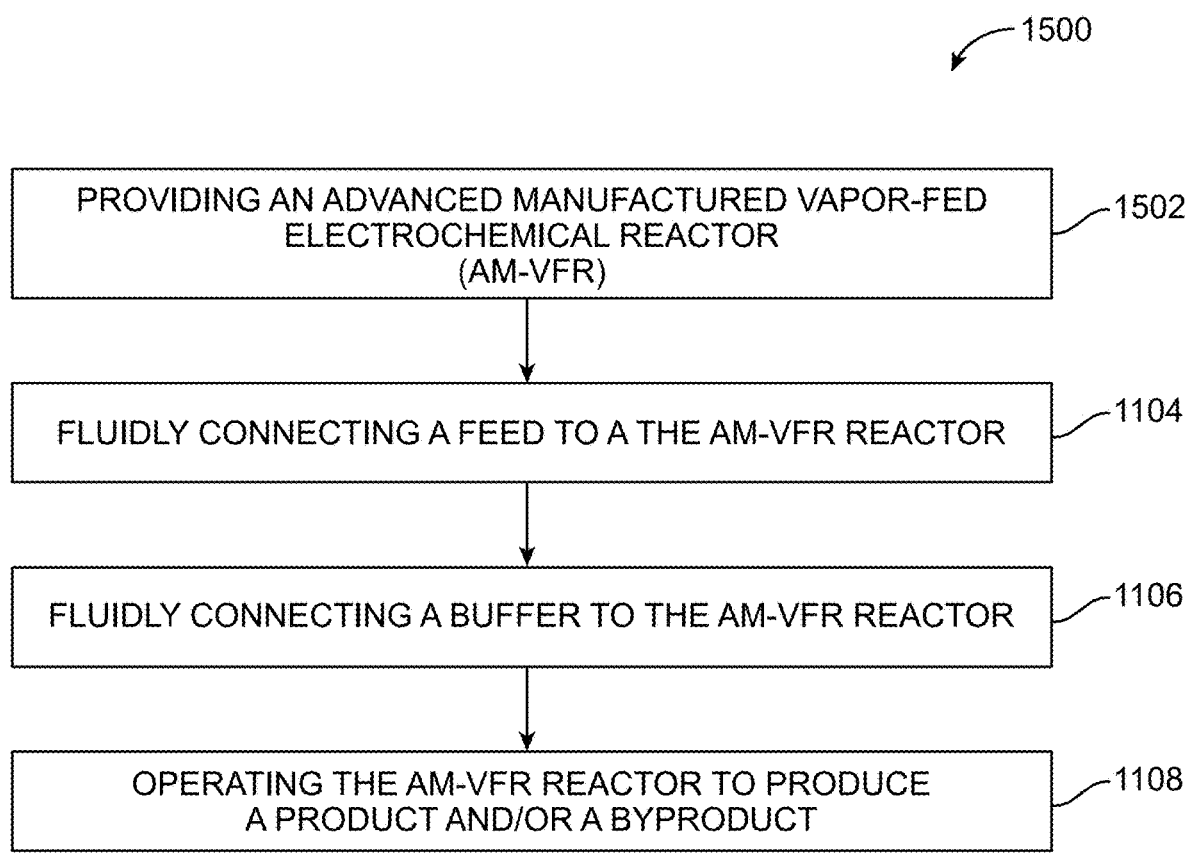
FIG. 15 illustrates a flow chart of a method of using an advanced manufactured vapor-fed electrochemical reactor (AM-VFR) according to an embodiment of the disclosure.

FIG. 15 illustrates a flow chart of a method of using an advanced manufactured vapor-fed electrochemical reactor (AM-VFR) according to an embodiment of the disclosure.

As shown in FIG. 15, the method of using the AM-VFR reactor includes: a) providing an AM-VFR reactor as discussed herein 1502; b) fluidly connecting a feed to the AM-VFR reactor 1504; c) fluidly connecting a buffer to the AM-VFR reactor 1506; and d) operating the AM-VFR reactor to produce a product 1508.

In an embodiment, the feed is one or more of $CH_4$, $CO_2$, CO, $H_2$, $H_2O$ and $O_2$. See e.g., FIGS. 4A-4B.

In an embodiment, the optional buffer is any $KHCO_3$ buffer. In an embodiment, the optional buffer is from 0.1 M to 1 M $KHCO_3$ in water. In an embodiment, the optional buffer is 1 M $KHCO_3$ in water. In an embodiment, the optional buffer is 0.1 $KHCO_3$ in water.

In an embodiment, the product is one or more of $CH_4$, $CH_3OH$, $CO_2$, $CO$, $C_2H_4$, $C_2H_4O$, $C_2H_4O_2$, $C_2H_5OH$, $C_3H_7OH$, $HCOOH$, H+, $H_2$, $H_2O$ and $O_2$. See e.g., FIGS. 4A-4B.

The embodiments and examples set forth herein are presented to best explain the present disclosure and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the disclosure to the precise form disclosed. Many modifications and variations are possible in light of the above teaching without departing from the spirit and scope of the following claims. The disclosure is specifically intended to be as broad as the claims below and their equivalents.

Definitions

As used herein, the terms "a," "an," "the," and "said" means one or more, unless the context dictates otherwise.

As used herein, the term "about" means the stated value plus or minus a margin of error, or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the term "simultaneously" means occurring at the same time or about the same time, including concurrently.

INCORPORATION BY REFERENCE

All patents and patent applications, articles, reports, and other documents cited herein are fully incorporated by reference to the extent they are not inconsistent with this disclosure.

What is claimed is:

1. An advanced manufactured vapor-fed electrochemical reactor (AM-VFR) system comprising:
    a) a cathode gas compartment having a first inlet, and a first outlet;
    b) a catholyte compartment having a first side facing the cathode gas compartment and a second side, which is opposite to the first side, wherein the catholyte compartment has (i) an opening extending through a thickness of the catholyte compartment between the first side and the second side, wherein the opening is centrally located on the first side and the second side, (ii) a second inlet, (iii) a second outlet, and (iv) a reference electrode;
    c) an anolyte compartment having a first side facing the second side of the catholyte compartment and a second side opposite to the first side, wherein the anolyte compartment has (i) an opening extending through a thickness of the anolyte compartment between the first side and the second side, wherein the opening is centrally located on the first side and the second side, (ii) a third inlet and (iii) a third outlet; and
    d) an anode gas compartment having a fourth inlet and a fourth outlet;
    e) a cathode between the cathode gas compartment and the first side of the catholyte compartment;
    f) a membrane between the second side of the catholyte compartment and the first side of the anolyte compartment; and
    g) an anode between the second side the anolyte compartment and the anode gas compartment;
    wherein one or more of the cathode gas compartment, the catholyte compartment, the anolyte compartment and the anode gas compartment are made of a 3D printing plastic;
    wherein the opening of the catholyte compartment has a geometric surface area from about 1 $cm^2$ to about 100 $cm^2$; and
    wherein the opening of the anolyte compartment has a geometric surface area from about 1 $cm^2$ to about 100 $cm^2$.

2. The system of claim 1, wherein the first inlet of the cathode gas compartment and the fourth inlet of the anode gas compartment are feed inlets for one or more of $CH_4$, $CO_2$, CO, $H_2$, $H_2O$ and $O_2$.

3. The system of claim 1, wherein the cathode comprises an electrocatalyst and a support, wherein the electrocatalyst is one or more of Ag, Au, Cu, Fe, $IrO_2$, Ni, Pd, Pt, Sn, metal alloys thereof and metal oxides thereof.

4. The system of claim 3, wherein the support is one or more of a fluorinated ethylene propylene (FEP), a perfluoroalkoxy alkane (PFA), a polychlorotrifluoroethylene (PCTFE), an ethylene chlorotrifluoroethylene (ECTFE) and a polytetrafluoroethylene (PTFE).

5. The system of claim 1, wherein the cathode is Cu-polytetrafluoroethylene (PTFE).

6. The system of claim 1, wherein the cathode, the membrane and the anode have a geometric surface area from about 1 $cm^2$ to about 100 $cm^2$.

7. The system of claim 1, wherein the cathode has a cathode geometric current density from about 35 $mA/cm^2$ to about 500 $mA/cm^2$.

8. A method of using an advanced manufactured vapor-fed electrochemical reactor (AM-VFR) comprising:
    operating the AM-VFR reactor system of claim 1, wherein the AM-VFR reactor system is fluidly connected to a feed and a buffer to produce a product.

9. The method of claim 8, wherein the feed comprises one or more of $CH_4$, $CO_2$, CO, $H_2$, $H_2O$ and $O_2$.

10. The method of claim 8, wherein the feed comprises $CO_2$.

11. The method of claim 8, wherein the feed comprises CO.

12. The method of claim 8, wherein the feed has a flow rate of <about 15 sccm (standard cubic centimeters per minute).

13. The method of claim 8, wherein the feed has a flow rate of <about 5 sccm (standard cubic centimeters per minute).

14. The method of claim 8, wherein the buffer is from about 0.1 M to about 1 M $HCO_3$ in water.

15. The method of claim 8, wherein the buffer has a flow rate of <about 100 mL/min.

16. The system of claim 8, wherein a cathode has a cathode geometric current density from about 35 $mA/cm^2$ to about 500 $mA/cm^2$.

17. The system of claim 8, wherein a cathode has a cathode geometric current density from about 200 $mA/cm^2$ to about 500 $mA/cm^2$.

18. The method of claim 8, wherein the product is one or more of $CH_4$, $CH_3OH$, $CO_2$, CO, $C_2H_4$, $C_2H_4O$, $C_2H_4O_2$, $C_2H_5OH$, $C_3H_7OH$, HCOOH, H+, $H_2$, $H_2O$ and $O_2$.

19. The method of claim 8, wherein the product comprises one or more of $C_2H_4$, $C_2H_5OH$ and $O_2$.

20. A method of making the advanced manufactured vapor-fed electrochemical reactor (AM-VFR) system of claim 1, the method comprising:
 a) printing one or more of a cathode gas compartment, a catholyte compartment, an anolyte compartment and a anode gas compartment of the AM-VFR reactor using a 3D printing technique; and
 b) assembling the AM-VFR reactor such that a cathode is disposed between the cathode gas compartment and the catholyte compartment, a membrane is disposed between the catholyte compartment and the anolyte compartment, and an anode is disposed between the anolyte compartment and the anode gas compartment.

21. The method of claim 20, wherein the 3D printing technique is a stereolithography (SLA) 3D printing technique, an extrusion 3D printing technique or a selective laser sintering 3D printing technique.

22. The method of claim 20, wherein the 3D printing technique is a stereolithography (SLA) 3d printing technique.

23. The method of claim 20, further comprising:
 c) fluidly connecting a plurality of AM-VFR reactors in parallel to increase productivity.

24. The method of claim 20, further comprising:
 c) fluidly connecting a plurality of AM-VFR reactors in series to improve conversion.

25. The system of claim 1, wherein the centrally located opening of the catholyte compartment has the geometric surface area of about 1 $cm^2$; and
 wherein the centrally located opening of the anolyte compartment has the geometric surface area of about 1 $cm^2$.

26. The system of claim 1, wherein the centrally located opening of the catholyte compartment has a rectangular prism shape; and
 wherein the centrally located opening of the anolyte compartment has a rectangular prism shape.

* * * * *

UNITED STATES PATENT AND TRADEMARK OFFICE
CERTIFICATE OF CORRECTION

| | | |
|---|---|---|
| PATENT NO. | : 12,146,234 B2 | Page 1 of 1 |
| APPLICATION NO. | : 17/010680 | |
| DATED | : November 19, 2024 | |
| INVENTOR(S) | : Feaster et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this
Second Day of September, 2025

Coke Morgan Stewart
*Acting Director of the United States Patent and Trademark Office*